(12) United States Patent
Mathiowetz

(10) Patent No.: US 8,700,224 B2
(45) Date of Patent: Apr. 15, 2014

(54) SYSTEM FOR A SINGLE POINT PLUG-IN, CONNECTION OF ANY COMBINATION OF ELECTRIC ENERGY SUPPLY SOURCES COMBINED WITH SMART LOAD MANAGEMENT AND CONTROL OF BOTH SUPPLY AND CONSUMPTION OF ELECTRIC ENERGY BY A HOME OR SMALL BUSINESS

(75) Inventor: Michael Mathiowetz, Minnetonka, MN (US)

(73) Assignee: Renewable Energy Technology Group Ltd. (RETG), Snoqualmie, WA (US)

( * ) Notice: Subject to any disclaimer, the term of this patent is extended or adjusted under 35 U.S.C. 154(b) by 965 days.

(21) Appl. No.: 12/491,641

(22) Filed: Jun. 25, 2009

(65) Prior Publication Data
US 2011/0004357 A1 Jan. 6, 2011

(51) Int. Cl.
*G05D 7/00* (2006.01)
*H05K 5/00* (2006.01)
(52) U.S. Cl.
USPC .............................. 700/295; 307/85; 361/724

(58) Field of Classification Search
USPC ............ 700/22, 275, 286, 292, 295; 361/704, 361/724; 307/85
See application file for complete search history.

(56) References Cited

U.S. PATENT DOCUMENTS

| | | | |
|---|---|---|---|
| 6,670,721 B2 * | 12/2003 | Lof et al. | 290/44 |
| 7,315,769 B2 * | 1/2008 | Balan et al. | 700/286 |
| 2007/0100503 A1 * | 5/2007 | Balan et al. | 700/286 |
| 2009/0088907 A1 * | 4/2009 | Lewis et al. | 700/286 |
| 2009/0189445 A1 * | 7/2009 | Strizki | 307/21 |

\* cited by examiner

*Primary Examiner* — Charles Kasenge

(57) ABSTRACT

A standardized system, method and apparatus for connection of any combination of electric energy supply source including the Utility Power Grid, Auxiliary Generator, Wind Turbine, Fuel Cell, Storage Battery, Solar Panel Array, and an Electric Car which are collectively aggregated to feed into the main Service Panel of the Home or Small Business through a single plug-in connection to the Home or Small Business's electrical service entrance and provide for collective operational monitoring and management through an IP Networked Communication Link, commonly referred to as IP Networked Communication across the Internet, thereby providing bidirectional communication and control between the GTC and the Smart Load Management functionality resident on the Internet Cloud.

33 Claims, 14 Drawing Sheets

Figure 1.2
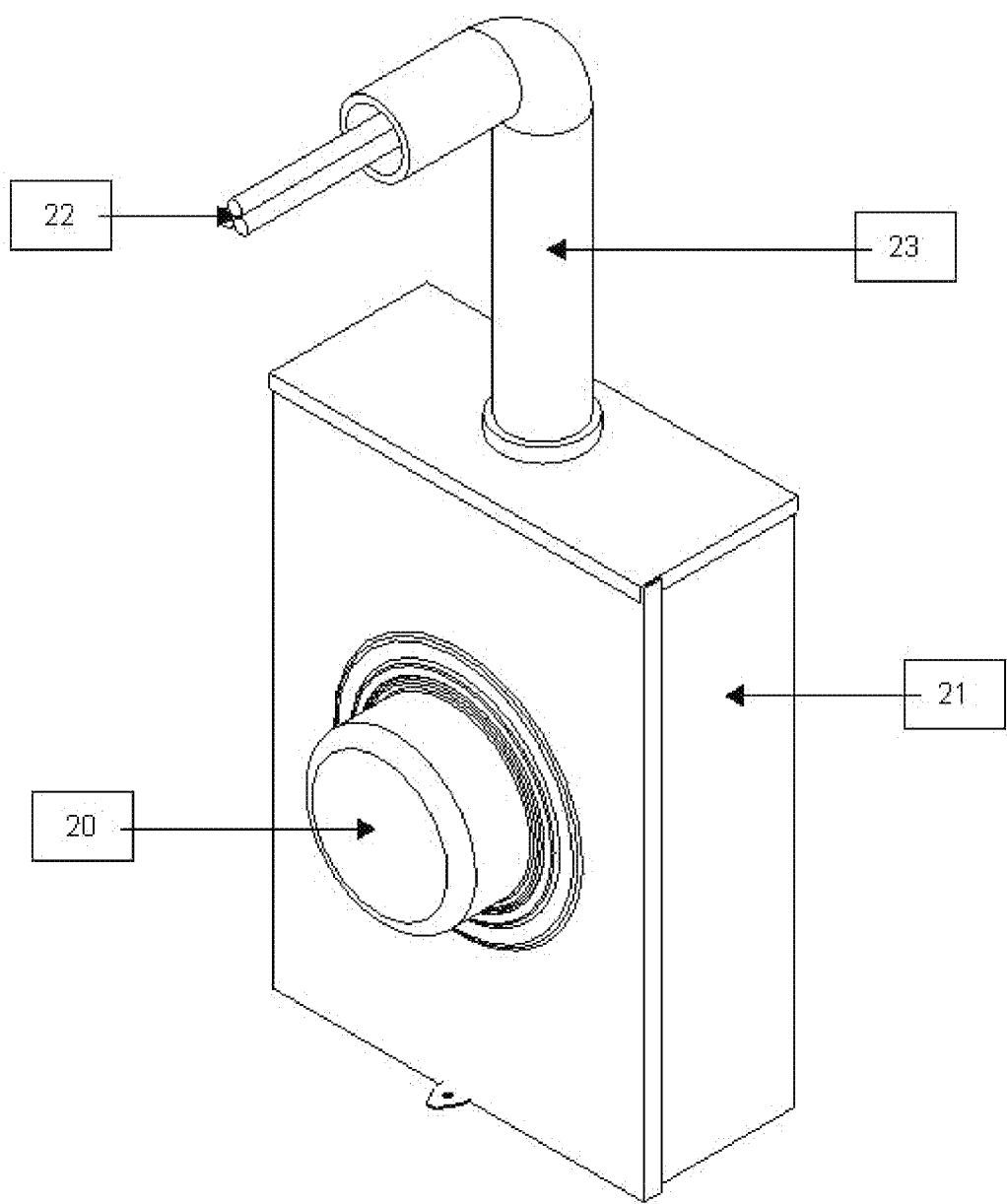

Figure 2.2
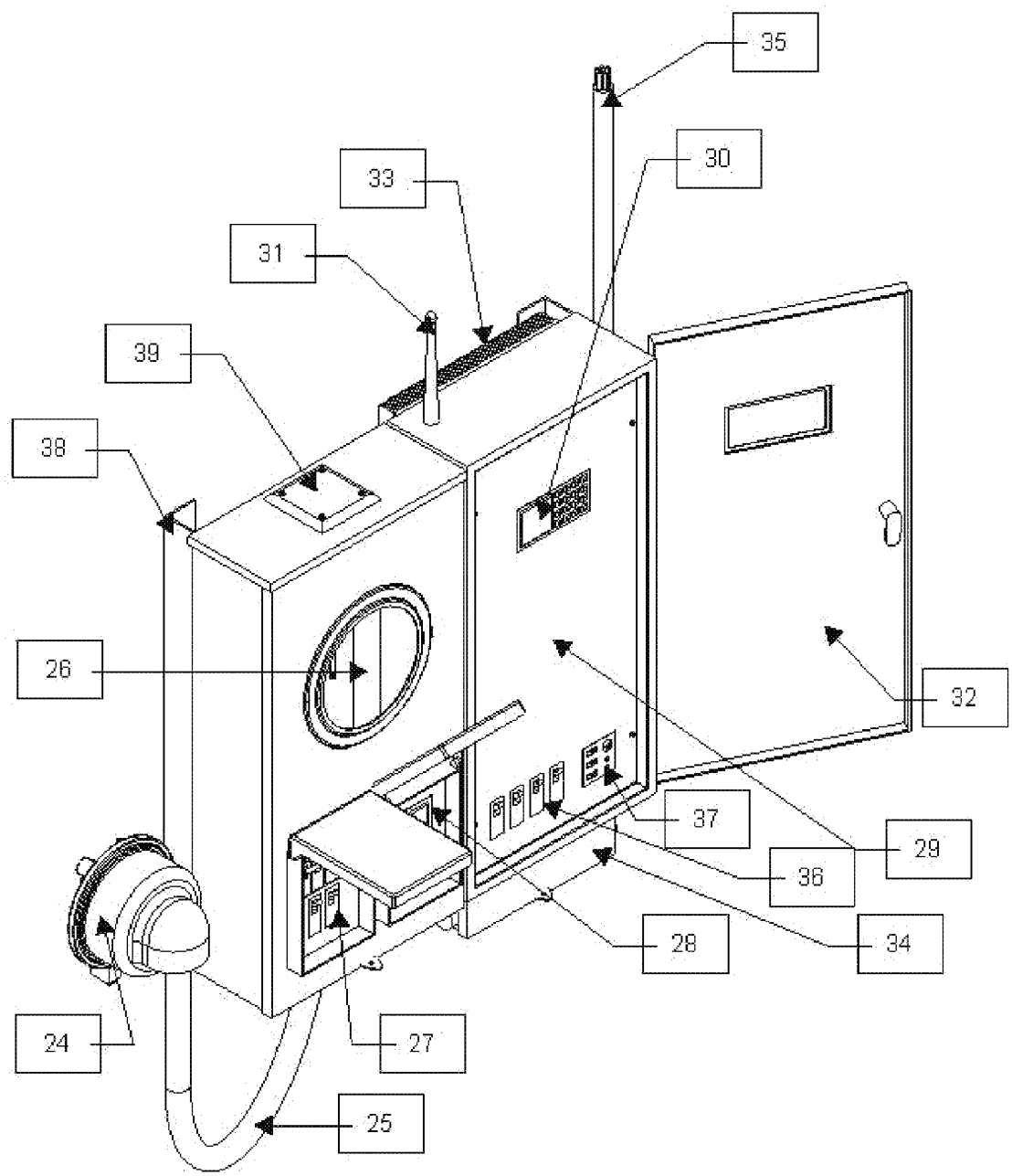

Figure 3.2
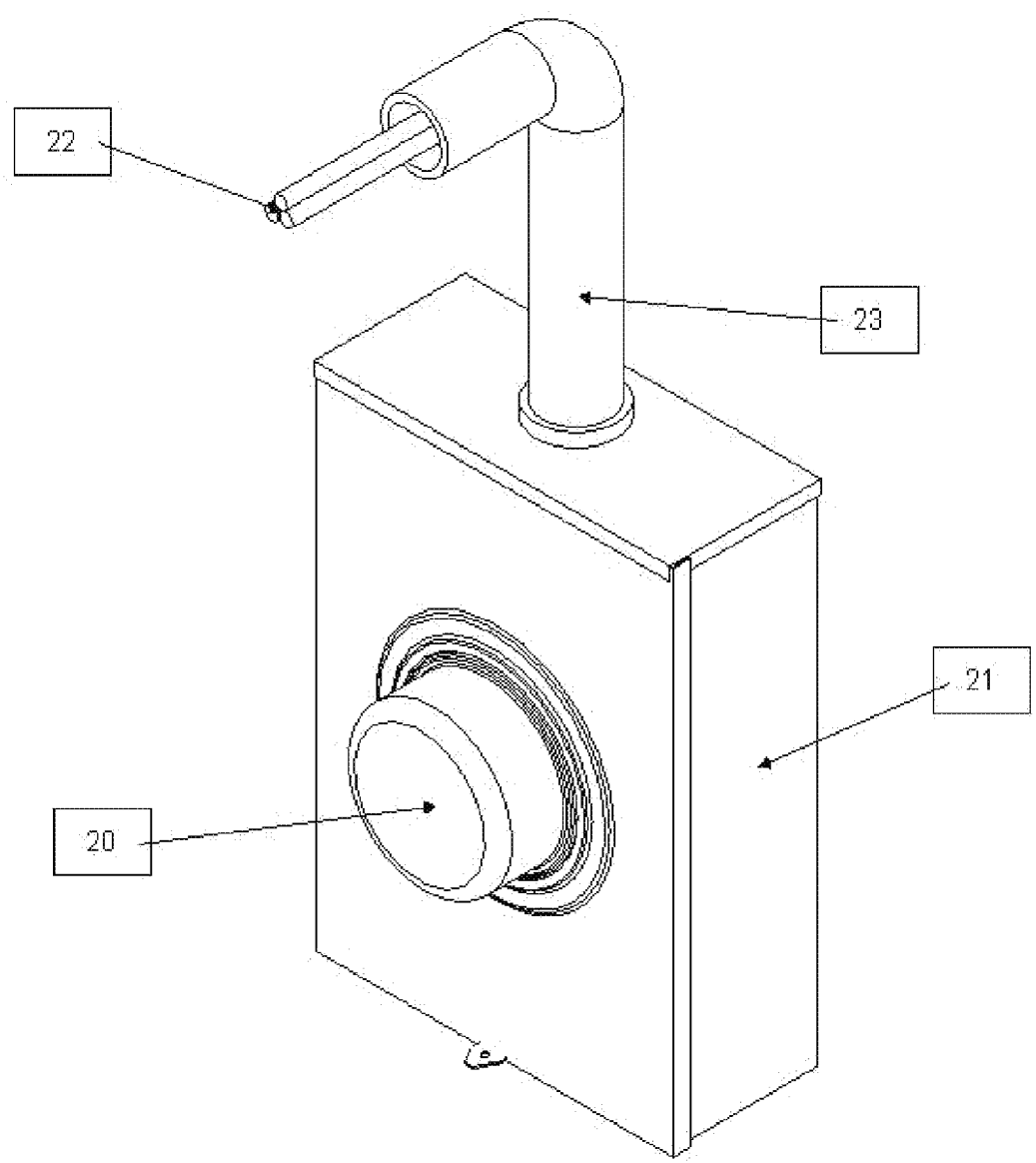

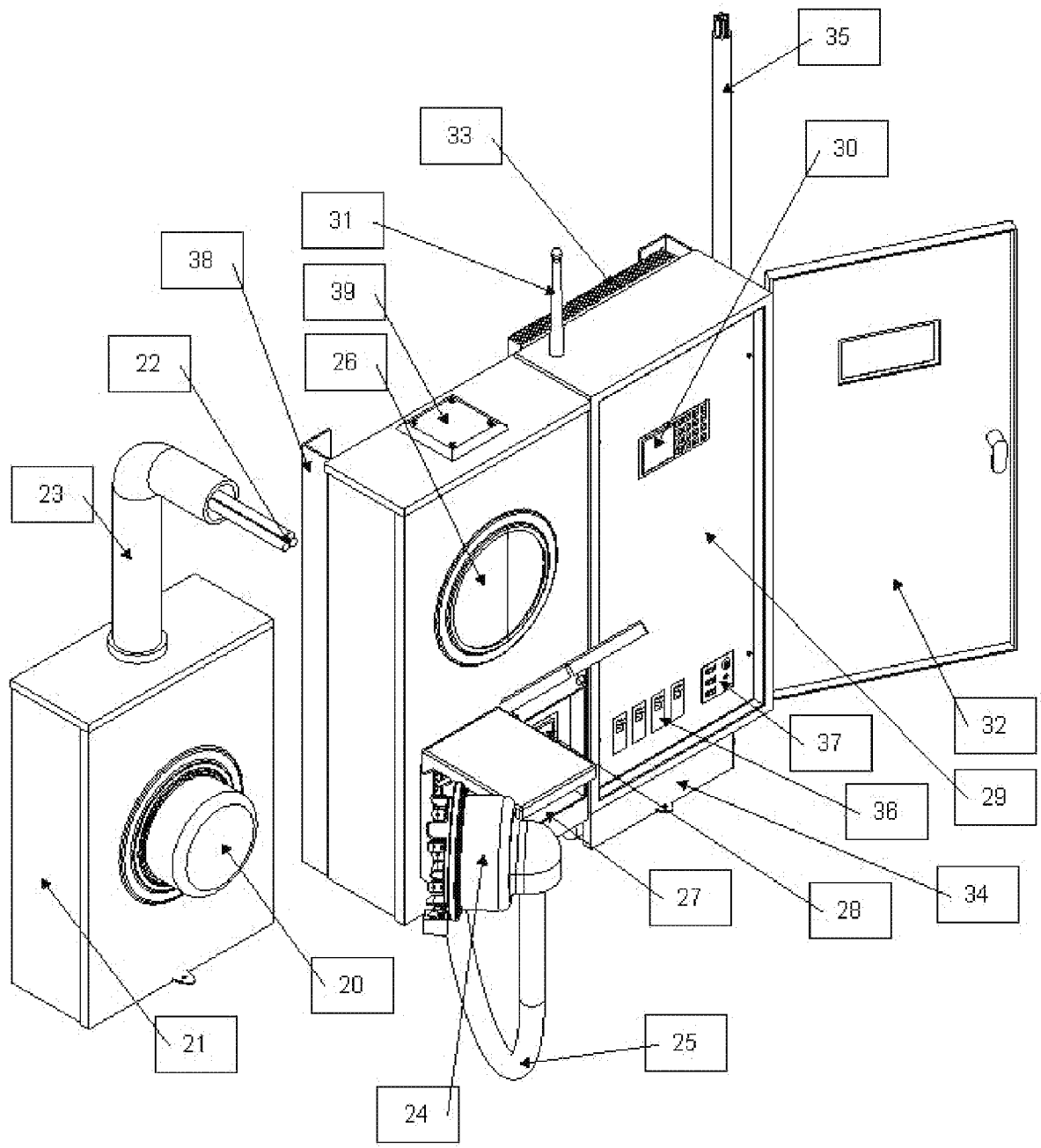
Figure 4.2

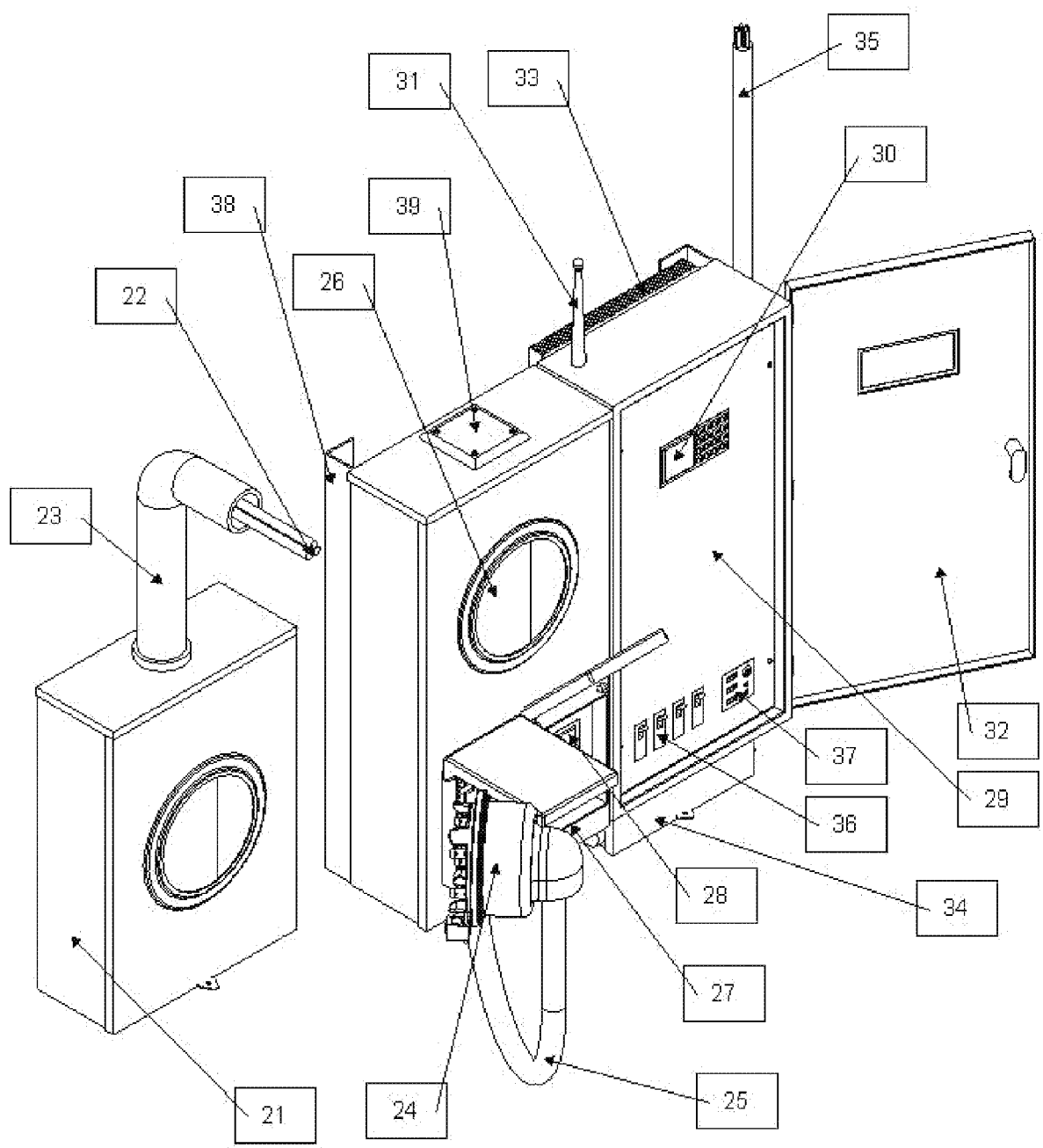
Figure 5.2

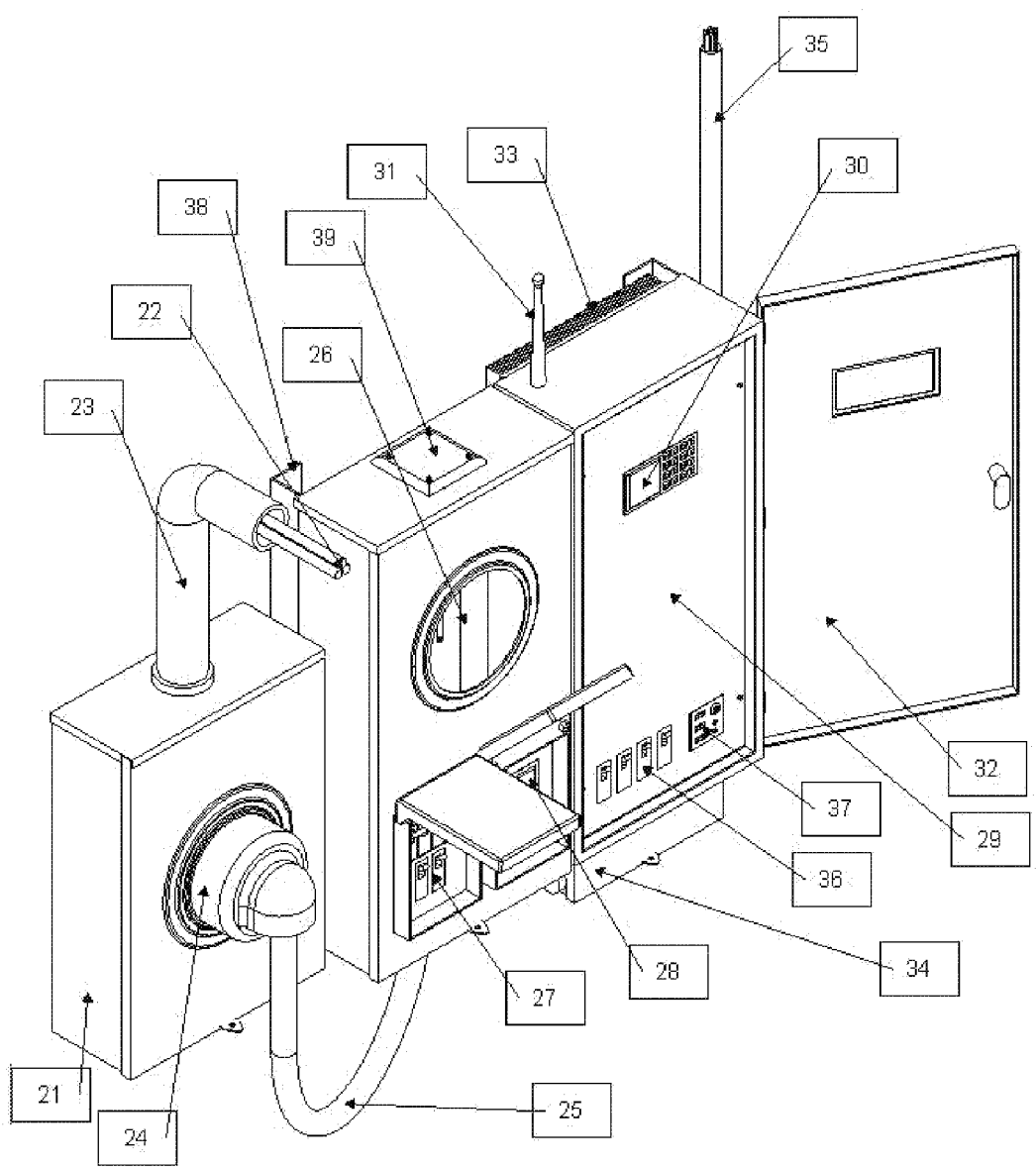
Figure 6.2

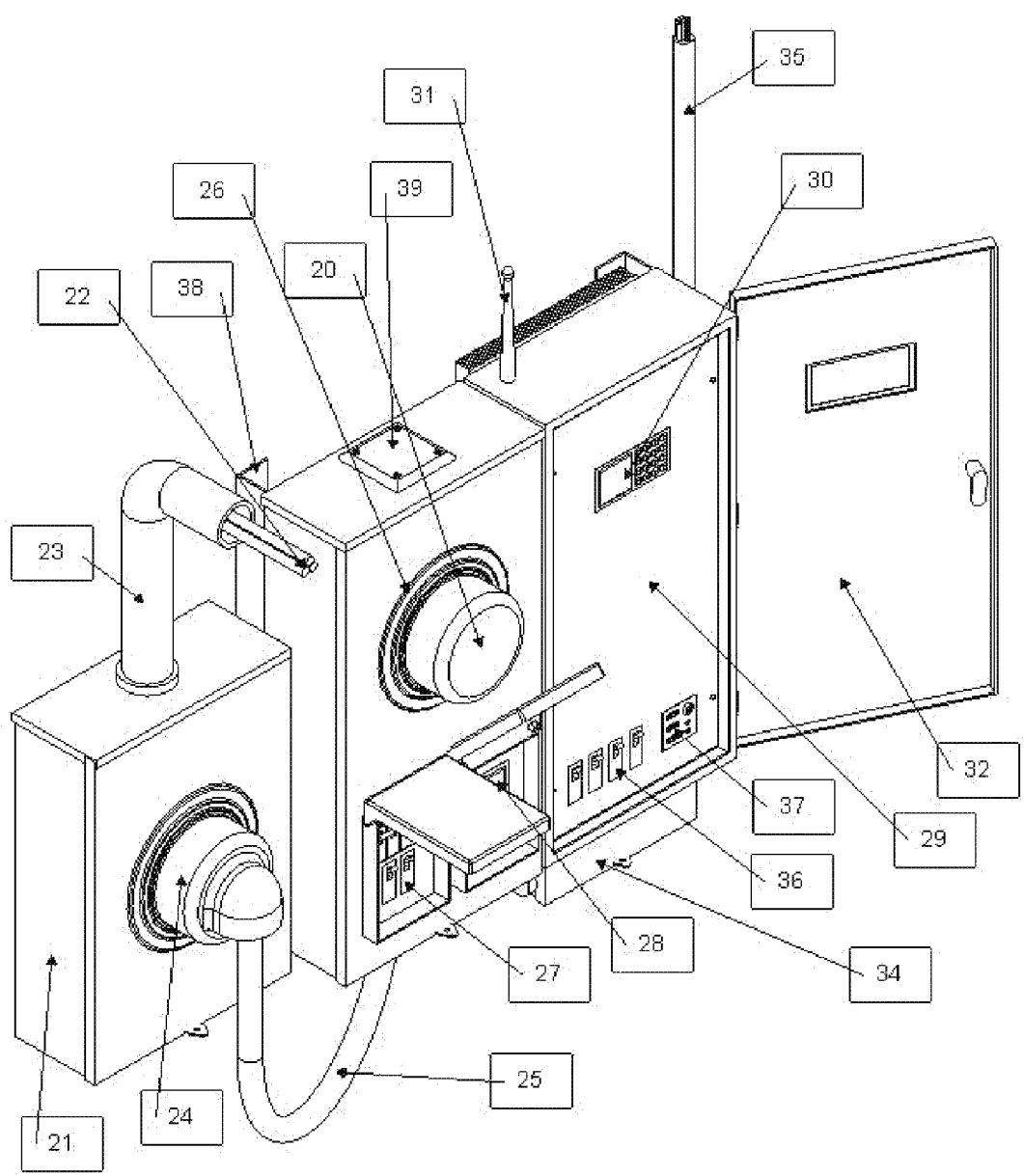
Figure 7.2

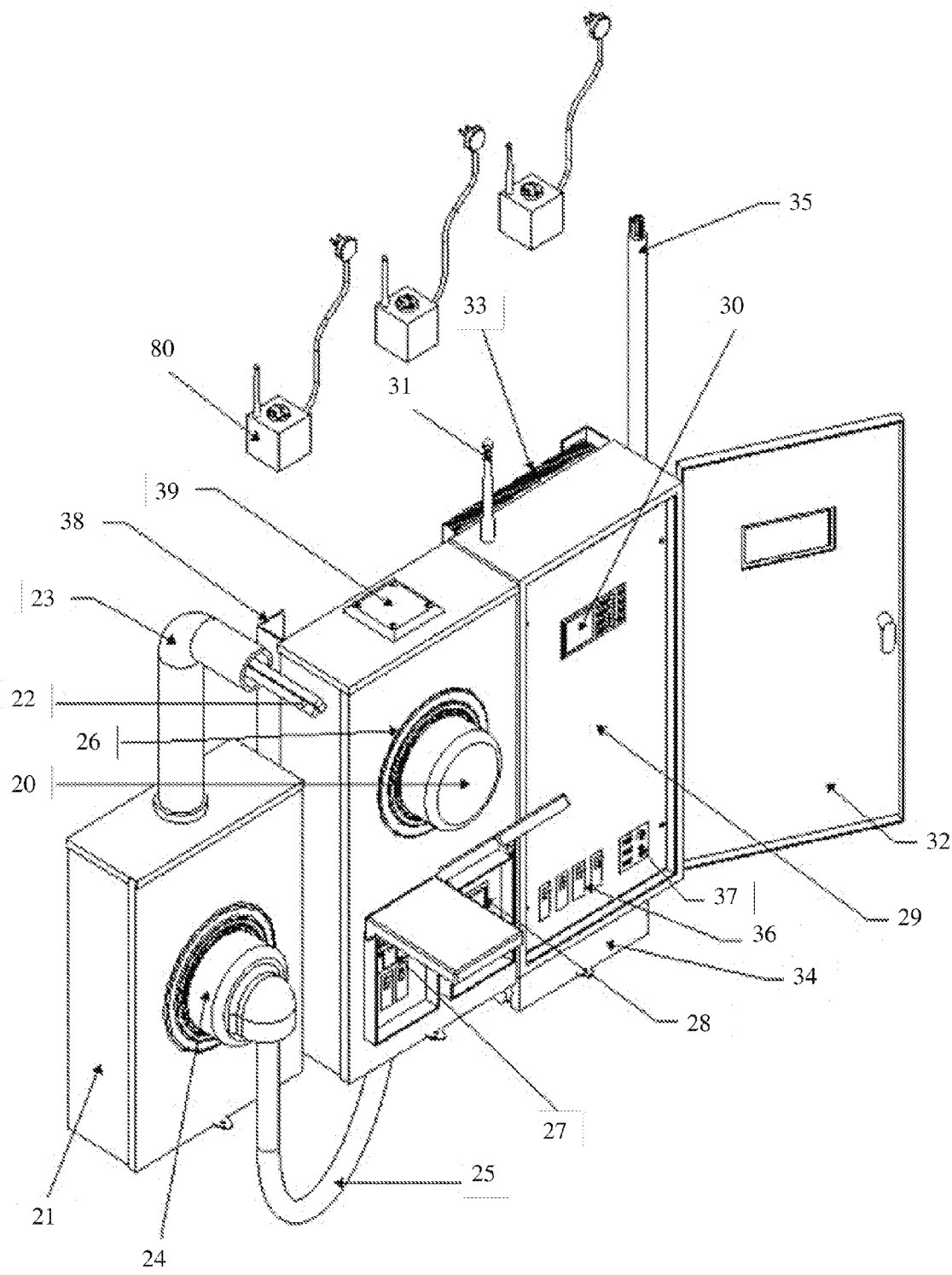
Figure 8.2

Figure 9.2
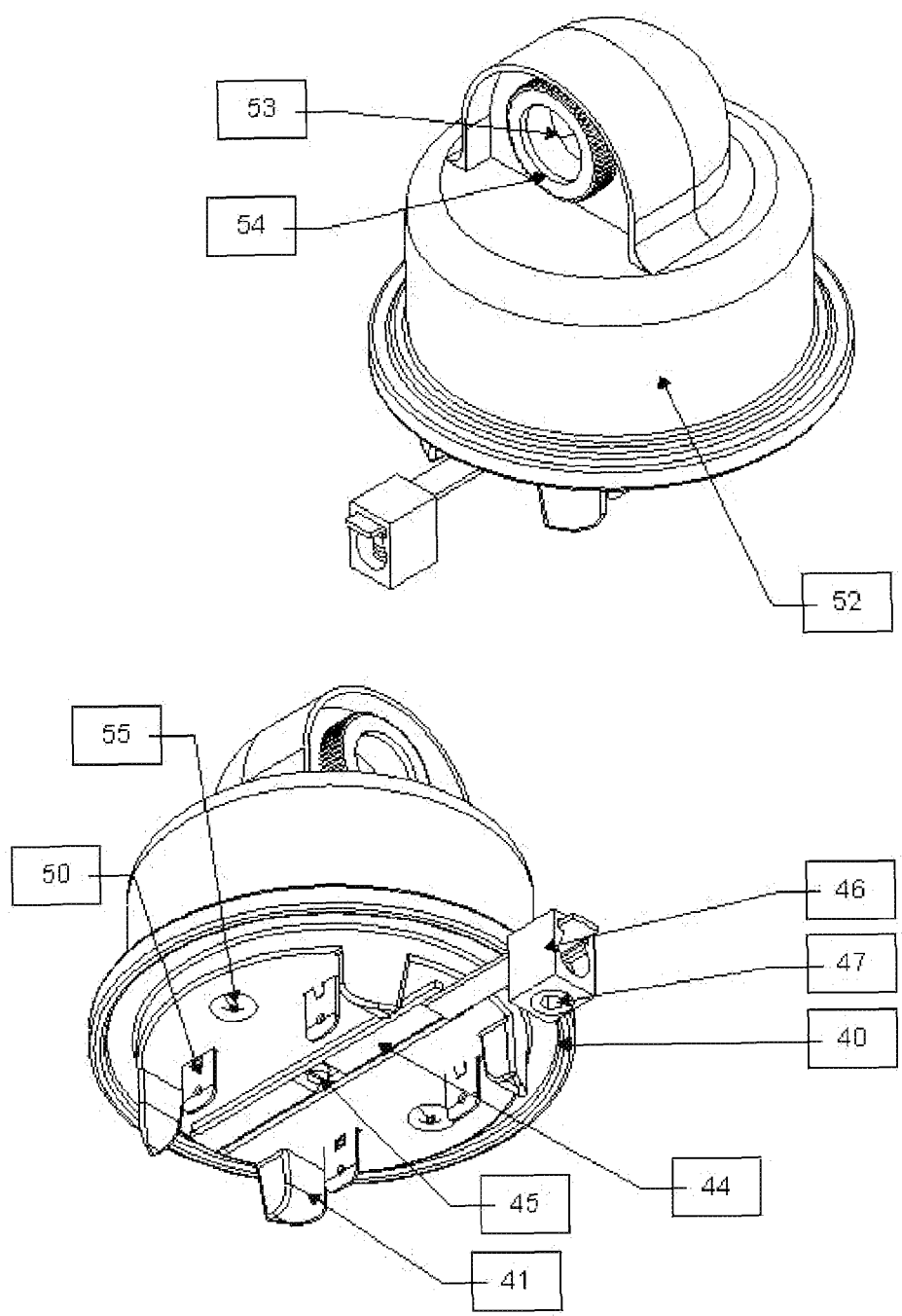

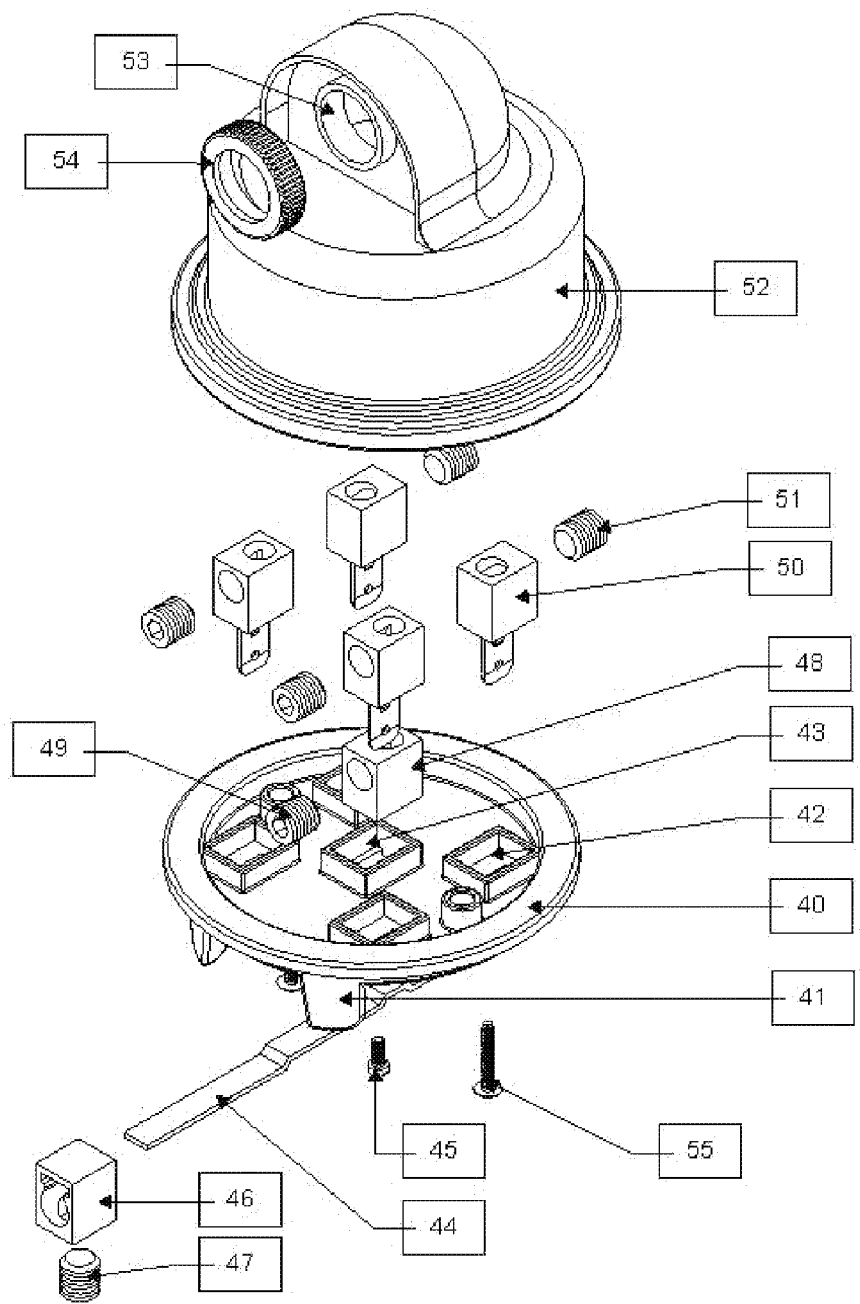
Figure 10.2

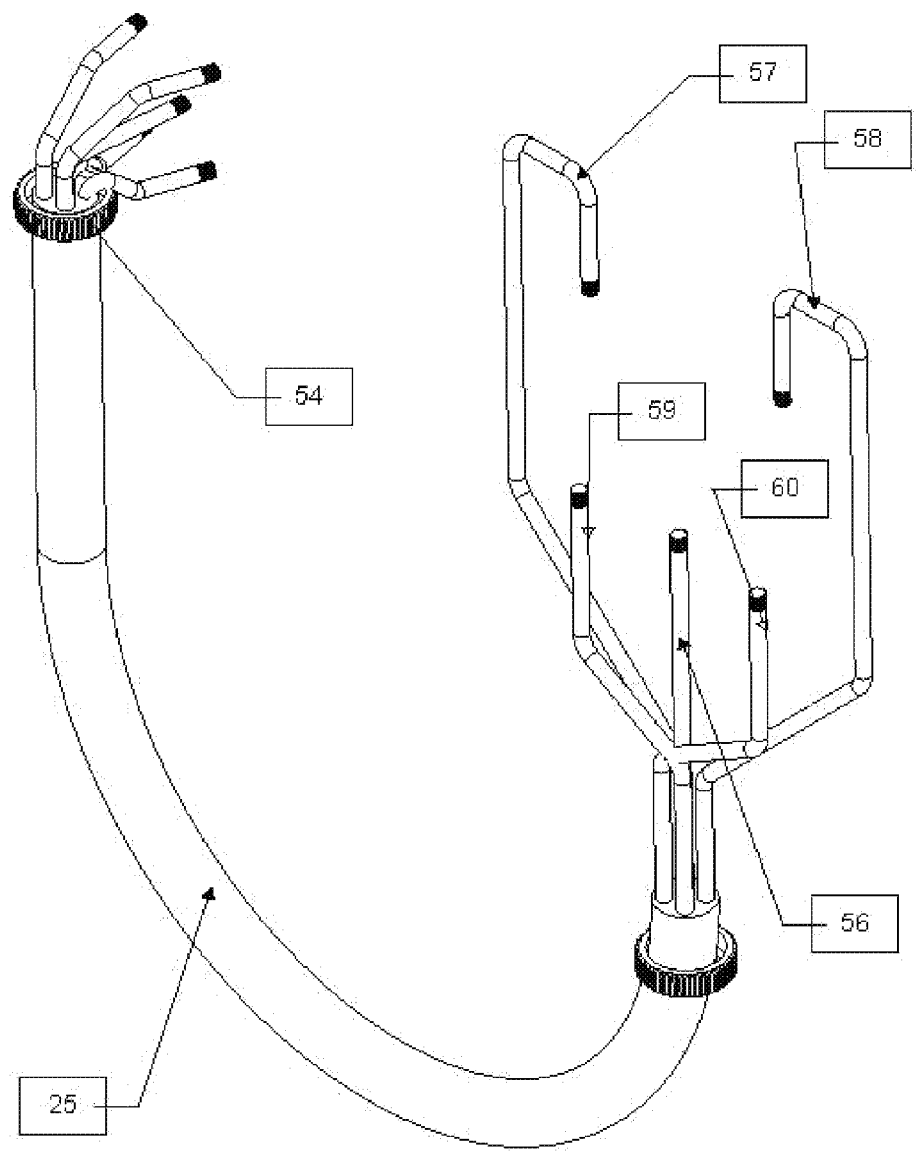
Figure 11.2

Figure 12.2
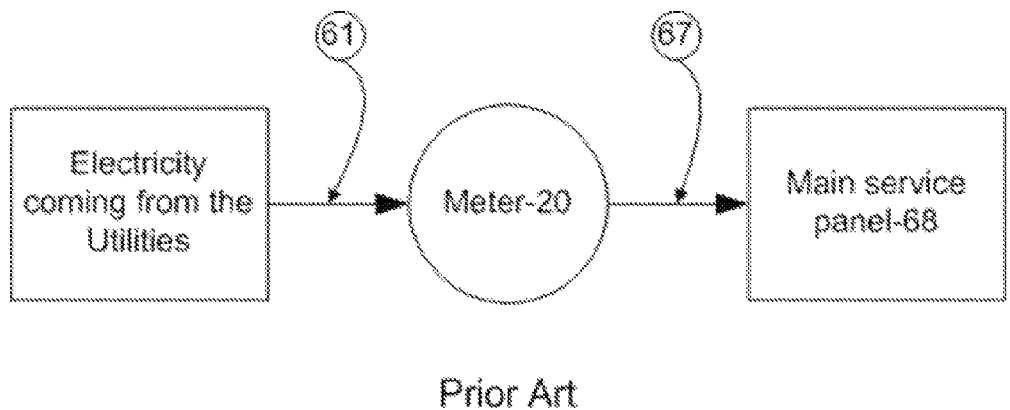
Prior Art

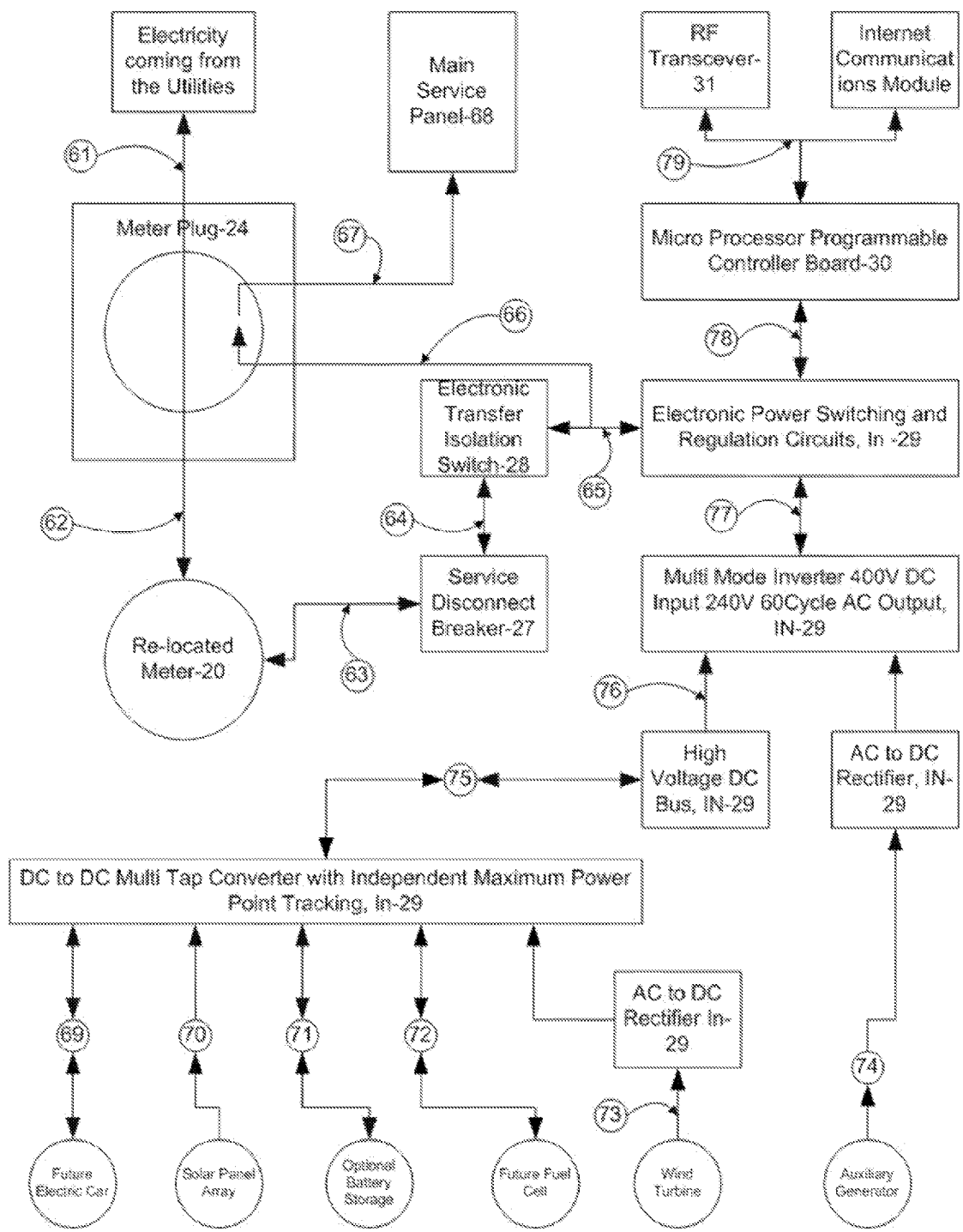
Figure 13.2

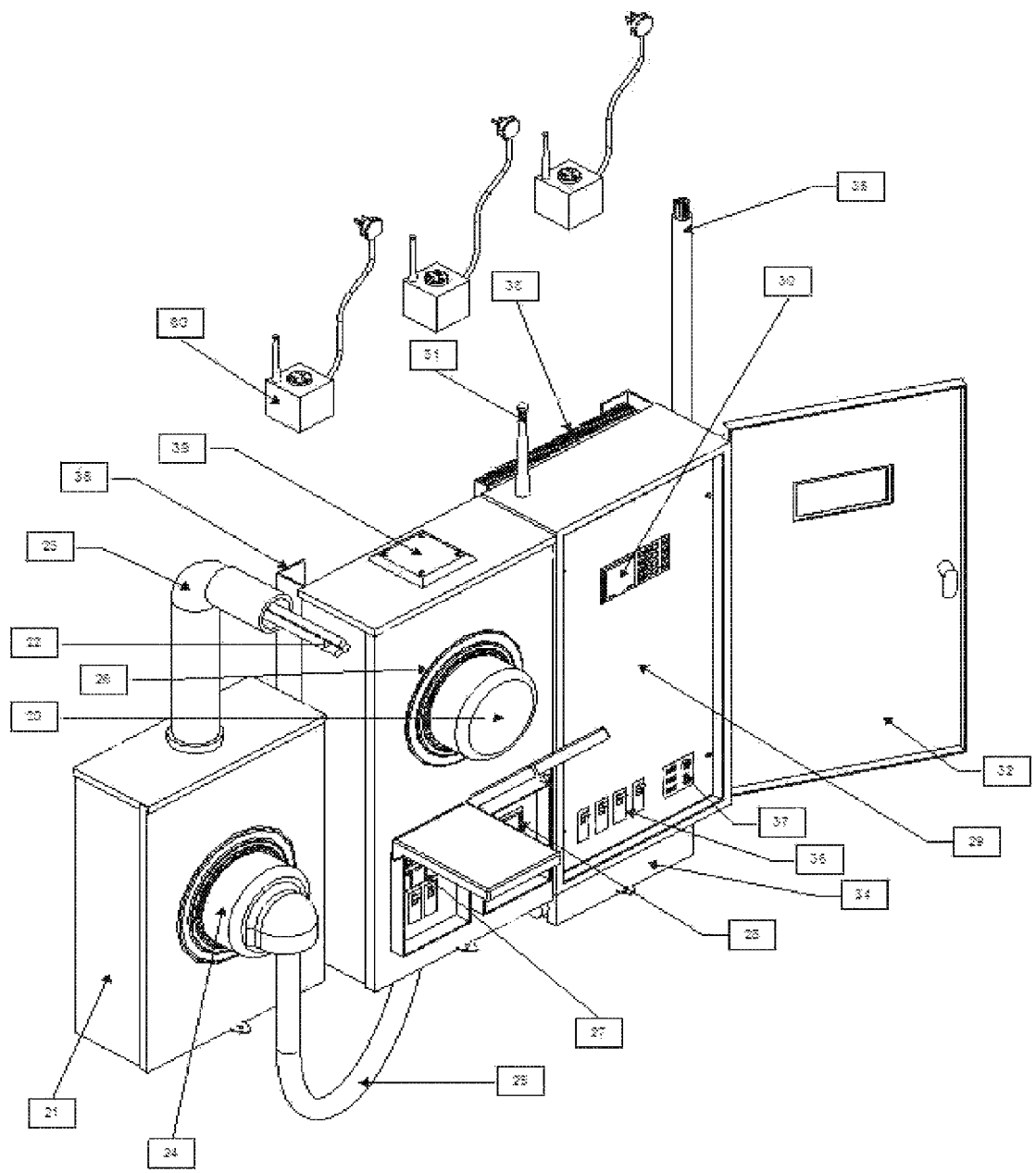
Figure 14.2

SYSTEM FOR A SINGLE POINT PLUG-IN, CONNECTION OF ANY COMBINATION OF ELECTRIC ENERGY SUPPLY SOURCES COMBINED WITH SMART LOAD MANAGEMENT AND CONTROL OF BOTH SUPPLY AND CONSUMPTION OF ELECTRIC ENERGY BY A HOME OR SMALL BUSINESS

FIELD OF THE INVENTION

The present invention synergistically relates to the distributed renewable alternative energy and home energy management industries. More particularly to, a system, method and apparatus for lowering the cost of installation by standardizing the process, accomplishing it completely outside the Home or Small Business and better controlling both the generation and use of electric energy by the Home or Small Business. The present invention further relates to a method of not only controlling the overall utilization of electric energy in the Home or Small Business as stated above, but also the monitoring and control of a Peak Demand or also called a Peak Load for the use of electric energy at any given moment in time. Management of Peak Demands or Loads is referred to as Demand Response Management by an Electrical Power Utility Companies. The condition of excessive Peak Demand often require the Electric Power Utility Companies to Load Shave or reduce overall electric demand by turning off electric devices and appliances which are not required. In summary, the present invention provides for a plug-in connection approach for the connection of any type of electric power supply source, which can be accomplished completely from outside the Home or Small Business, while at the same time offering unattended and automated operational control and management of both supply source and conservation management for the use of electric energy through bidirectional communication and interaction between the Grid-Tied Controller (GTC) and the Smart Load Management functionality residing on the Internet Cloud.

BACKGROUND OF THE INVENTION

Traditionally, Electric Power Utility Companies have supplied electric energy by generating it at a centralized power generation facility and then transmitting it to the location where it is being used. The transmission of the generated electricity is accomplished through a series of power transmission and distribution wires, substations and other supporting equipment that vary in size and capacity all of which are collectively referred to as a Utility Power Grid or just a Grid. As demand for electric energy has increased the Utility Power Grid is often operating at full transmission capacity and not capable of transmitting larger amounts of electricity at given moments in time. Along with the increase in demand for electric energy there is a growing awareness of the environmental impacts from pollutants that are created when generating the electricity at a Centralized Power Generation Facility using coal, natural gas or nuclear as the primary fuel.

There are many efforts underway to develop alternative renewable sources of electric energy generation in the United States and around the world to meet this growing demand for electric energy. A renewable generation project(s), of commercial scale are confronted with the same complexities as developing traditional centralized generation facilities regardless of whether coal, natural gas or nuclear fuel is being used. Beyond overcoming the environmental limitations, having sufficient transmission capacity in the Grid limits the cost effective development of alternative renewable sources of electric generation.

This situation is requiring Electric Power Utility Companies to look at new ideas they have never before considered. One of these is the concept of a Distributed Generation model and more specifically, a Micro Distributed Renewable Generation (MDRG). Simply put, this means locating renewable and other forms of electric energy generation at the site where the electric energy is going to be used instead of transmitting the electric energy long distances from a Centralized Power Generation Facility. To the extent the demand for electricity energy can be met with electricity generated at the point of use it serves to reduce the demand for transmission capacity on the Grid. While the effects realized on the Grid from a single Home or Small Business generating and controlling its use of electricity on site is minimal, if you were to aggregate thousands or even millions of participating Homes and Small Businesses the impact becomes very significant. So significant in fact, Electric Power Utility Companies are worried what impact these independently owned and operated, Grid connected, MDRG sites will have on the overall Grid stability, especially when the Electric Power Utilities have little or no control over the operation of these thousands or millions of MDRG sites. The present invention offers Electric Power Utility Companies, in cooperation with MDRG owners, a method to control large numbers of these sites when the GTC is utilized for connection to the Home or Small Business.

All MDRG incorporate a device called an Inverter. An inverter is used to condition the generated electricity from the renewable source of generation into a form of electricity useable by the electric appliances in the Home or Small Business making the frequency and voltage compatible with electricity provided from the Grid, which in most Homes and Small Businesses is single phase, denoted as AC, with a maximum voltage of 240 volts and a frequency, depending on the country where the Home or Small Business is located, as either 50 or 60 cycles per second, where cycles per second are denoted as Hz. The industry standard for articulating this type of electric supply in the United States is a Single Phase AC 120/240 Volt 60 Hz Service. In other countries, such as the UK it would be articulated as a Single Phase AC 230 Volt 50 Hz Service. The Grid-Tied Controller is adaptable to either the 50 Hz or 60 Hz Services and industry standards articulate this as a Single Phase AC 120/240 Volt & 50 Hz/60 Hz Service Compatible.

MDRG can be used either with or without connecting to the Grid. The primary benefit of a Grid Connected operation is that any generated energy that is not consumed by The Home or Small Business will be routed back to the Grid. This giving back electric energy to the Grid is commonly referred to as Net Metering. Net metering can effectively be thought of as reversing the flow of electricity so instead of coming from the Grid to the Home or Small Business the electricity goes from the Home or Small Business back out to the Grid. An Electric Meter (20) would in essence run backwards. The Present Invention automatically manages this Net Metering process and intelligently manages the electric energy based upon an owners elected preferences. It is expected that Electric Power Utility Companies will at some point become significant Owner-Operators or large numbers of the GTC. Instead of electricity being delivered from a Centralized Power Generation Facility through the Grid, Electric Power Utility Companies will provide the Home or Small Business its electricity by generating it locally at or near the Home or Small Business using a GTC in cooperation with the Home or Small Business owner.

The evolution of the Internet and networked communication of information shared across the Internet referred to as IP Networked Communication within the industry, has made it possible to intelligently manage not only the generation of electricity but also the use of it in near real time from remote locations. By combining MDRG, and IP Networking it is possible to now monitor and automatically manage the Home or Small Business's energy generation and consumption in accordance with an Owner's Preferences, Industry Accepted Practices or a Rules Based Triggers approach enacted in response to the receipt of real time market pricing signals transmitted by the Electric Power Utility Companies through IP Communication. All of this serves to lower an owners energy costs.

The simplest form of energy conservation is just an overall reduction in the number of appliances running and consuming energy. Turning an Electric Appliance off during periods of the day when electricity is in high demand and more expensive, running them for shorter periods of time and cycling them less frequently will all contribute to less electricity being used and cost savings for the owner of the Home or Small Business.

Another method of energy conservation is to control when appliances start up. Large motors momentarily require more electricity to initially start running then they do for continues normal operation. Getting a train car rolling from a dead stop requires more effort or energy than keeping it rolling. The same is true when starting larger appliances like air conditioner, pool pump, washing machine etc, all require a higher level of energy to start than required for normal operation. If multiple appliances attempt to start running at the same time there is an instant where there is an elevated requirement in the demand for electric energy, this is often referred to as a Peak Load or Peak Demand or s Surge Current by the Electric Power Utility Companies.

While this Peak Load or Surge Current only lasts for a moment, it can result in elevating the overall cost of electricity provided by the local serving Electric Power Utility Company because they must be ready and able to meet these Peak Demands and have standby generation sources up and running to do so. The elevated costs of running these standby generation sources is passed on to customers who are experiencing Peak Demands during certain periods of the day when overall demand for electricity is high and the Electric Power Utility Companies are having to run standby generation sources in order to meet both overall demand but also Peak Demands for electricity. There have been and are times when Peak Loads become so large, that even with standby generation Electric Power Utility Companies cannot supply the additional electricity and the result is what is called a "Brown Out" or where supply is not sufficient to meet the Peak Demand. By controlling the starting and stopping of electric appliances and the overall number of electric appliances that need to operate during periods of high demand, Peak Loads can be reduced or even eliminated in some cases. The present invention offers the functionality of managing overall demand for electricity during Peak Demand periods the result of which is referred to as Intelligent Micro Distributed Load Management or abbreviated in the industry as IMDLM.

As more and more manufacturers introduce residential and small business solar and wind MDRG the cost of MDRG is becoming more affordable. What has not been addressed and is not becoming more affordable are the labor costs associated with installing MDRG and IMDLM. The average cost to install typical MDRG large enough to power a few circuits of a 1000 square foot home or small business is $ 5,000 or more and this does not include the cost of the MDRG system itself. Most of this cost is the, time consuming wiring, involved with connection to the Main Service Panel of the Home or Small Business.

While new construction offers simplified access for wiring, the labor is still significant and there historically has been very little standardization to the installation and wiring process for MDRG on Homes and Small Businesses. Existing Homes and Small Businesses interject a multitude of additional complexities that all add labor costs to the installation process. This includes coordination with owners for access, drilling holes in walls, pulling wires through hard to reach places, clean up and finishing work to restore the interior decor of the home or small business.

Most MDRG and IMDLM systems for residential or small business applications are not designed to support more than a small number of isolated circuits in the Home or Small business. Most do not support any type of IP Networked Communication for remote monitoring and automated diagnostic reporting of Operating Parameters across the Internet for the Smart Load Management. There is no integrated functionality for controlling electric load and generation resources. The GTC offers all of this functionality.

For there to be a viable, low cost, widely adopted MRDG and IMDLM offering there will need to be simple, intuitive, and a Low Cost Installation Process (LCIP) The offering will need to demonstrate value to the Home and Small Business owner, Electric Power Utility Companies and demonstrate a high level of environmental stewardship and operational safety. the offering must be available to buyers on a turnkey basis, requiring no involvement of the buyer in the installation process or ongoing maintenance and servicing. The offering must be self diagnostic and reporting of both operational and environmental site parameters and support automated and unattended operation. The present invention, the GTC incorporates both MDRG, IMDLM and LCIP for Home and Small Business owners delivering a safe, trouble free, turnkey and standardized approach to long term electric energy cost savings.

SUMMARY OF THE INVENTION

This is a standardized system, method and apparatus that provides a simplified turnkey approach for the plug-in connection of any combination of electric energy supply sources, including the Utility Power Grid, Auxiliary Generators, Wind Turbines, Fuel Cells, Storage Battery, Solar Panel Arrays, and future Electric Car Batteries all feeding into the Main Service Panel of the Home or Small Business entirely coupled with Smart Load Management that is integrated for control of electric energy supply sources, energy conservation and Peak Load Management at an individual electric appliance level being electrically powered from the Main Service Panel of the Home or Small Business.

It would be advantageous to provide a plug-in, single point connection on the exterior of the Home or Small Business that would effectively permit the safe connection of any type of electrical supply source to the Home or Small Business eliminating costly and disruptive rewiring of the Home or Small Business's electrical service entrance and or the Main Service Panel.

It would further be advantageous to provide a system that can be monitored and managed though the Internet by the owner or local serving Electric Power Utility Company or both wherein both GTC operational and environmental site parameters at the Home or Small Business could be observed.

It would further be advantageous to provide a system that provides for wireless, near real time, automated smart energy conservation control and management down to an individual participating Electric Appliance level inside the Home or Small Business that functions by applying pre-programmed rules based triggers in response to receiving real time market pricing signals from the local serving Electric Power Utility Company through IP Networked Communication.

BRIEF DESCRIPTION OF THE DRAWINGS

A complete understanding of the present invention may be obtained by reference to the accompanying drawings, when considered in conjunction with the subsequent, detailed description, in which:

FIG. 1.2 is a perspective view of a Meter Receiver Box (21) and an Electric Meter (20) with a Power Mast (23), used on most residential and small business buildings;

FIG. 2.2 is a perspective view, of the system for a single plug-in installation of the GTC with IMDLM showing the major components of the system;

FIG. 3.2 is a perspective view of the installation process showing step one;

FIG. 4.2 is a perspective view of the installation process showing step two;

FIG. 5.2 is a perspective view of the installation process showing step three;

FIG. 6.2 is a perspective view of the installation process showing step four;

FIG. 7.2 is a perspective view of the installation process showing step five;

FIG. 8.2 is a perspective view of the installation process showing step six;

FIG. 9.2 is a perspective view of a Meter Jumper Plug (24), a key element of the GTC;

FIG. 10.2 is an exploded view of the Meter Jumper Plug (24);

FIG. 11.2 is a perspective view of a Custom Wire Harness (25), a further key element of the present invention;

FIG. 12.2 is a flow chart view of a typical flow of electricity from the Utility Power Grid;

FIG. 13.2 is a flow chart view of a flow of electricity in accordance with the present invention from the Utility Power Grid to the Main Service Panel (68) through the GTC;

FIG. 14.2 is a perspective view of a completed system and method for single plug-in installation of the GTC;

For purposes of clarity and brevity, like elements and components will bear the same designations and numbering throughout the Figures.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1.2 is a typical perspective view of the Meter Receiver Box (21) and the Electric Meter (20) with the Power Mast (23), used on most residential and small business buildings. This is considered a typical installation on most Homes and Small Business buildings in the United States. This embodiment includes a set of Feed In Utility Power Lines (22) coming from the Utility Power Grid; The Feed In Utility Power Lines are attached to the Meter Receiver Box (21) through the Power Mast that is connected either from overhead or coming up from underground. The Electric Meter is plugged into the Meter Receiver Box thus completing the connection so the electricity from the Utility Power Grid can feed through the Feed In Utility Power Lines into the Electric Meter on into the Main Service Panel.

FIG. 2.2 is a perspective view of the GTC showing the major components of the GTC. A primary goal of the present invention was to provide a means where the GTC could be connected and installed with a single plug-in method on the exterior of the building reducing the cost of installation. To that goal the Meter Jumper Panel was invented, detailed descriptions are discussed in FIGS. 9.2, 10.2 and 11.2. The Meter Jumper Plug is installed by removing the Electric Meter from the Meter Receiving Boz and inserting the Meter Jumper Plug in its place. This serves to extend the Feed In Utility Power Lines through the Meter Jumper Plug and a Power Blade Blocks (50) by making the connection between the Feed In Utility Power Lines and a Supply Power Wire No.1 (57), a Supply Power Wire No.2 (58) and a Neutral Wire (56) which are all contained inside a Custom Wire Harness (25) that extends out of the Meter Jumper Plug over into a Weather Tight Custom Cabinet (32) where the other ends of the Power Wire No.1 and Power Wire No.2 ad Neutral Wire connect to the supply side terminals of a New System Meter Socket (26) contained in the Weather Tight Custom Cabinet.

After electric power has passed through the Electric Meter placed back in the New System Meter Socket it travels to a Main Breaker (27), which provides a shut off from the Utility Power Grid. Once electric power has passed through the Main Breaker, the electric power feeds into an Electronic Transfer Isolation Switch (28), which is a switch that electronically senses the loss of electric power feeding the Utility Power Lines coming from the Utility Power Grid. In the event of a Utility Power Grid power outage the Electronic Transfer Isolation Switch automatically opens serving to disconnect the Home or Small Business's Main Service Panel from the Utility Power Grid. This permits the GTC to continue to operate during a Utility Power Grid outage, supplying the Home or Small Business with locally generated electricity from renewable generation sources, Storage Battery, Fuel Cell or Auxiliary Generator without having electricity flow backwards out to the Utility Power Grid, which is referred to as back feeding, in the industry. When the Utility Power Grid power is restored to the Utility Power Lines the Electronic Transfer Isolation Switch automatically senses the return of the Utility Power Grid power to the Utility Power Lines and electronically closes or reconnects the Home or Small Business's GTC to the Utility Power Grid, synchronizing the power frequency and voltage of the GTC's renewable and any other locally generated sources of electricity to be the same as the Utility Power Grid power. Storage Battery The GTC combined Utility Power Grid power with locally generated and stored electrically and feeds the combined electricity from the Weather Tight Custom Cabinet back through a Feed In Power Wires No.3 (59) and a Feed In Power Wire No.4 (60) contained within the Custom Wire Harness back to the Meter Jumper Plug which is connected to the feed in Power Blade Blocks which in turn makes the connection to feed power into the Main Service panel of the Home or Small Business to meet a Demand for electricity which is often referred to as a Load) in the Home or Small Business. The New System Meter Socket within the Weather Tight Custom Cabinet becomes a new connection point for the reconnection of the Electric Meter or in new construction the Weather Tight Custom Cabinet with New System Meter Socket replaces the need for having a separate Meter Receiver Boz and the use of the Meter Jumper Plug and Custom Wire Harness are not required. For new construction the Power Mast and Utility Power Lines are attached and routed into the Weather Tight Custom Cabinet directly.

Further contained in the Weather Tight Custom Cabinet is a Multi-Mode Inverter/Converter (29) with a Multi-Mode Inverter/Converter Control Panel (30). This Multi-Mode Inverter/Converter is unique in that it will support the connection of multiple generation devices simultaneously. The GTC's Multi-Mode Inverter/Converter Control Panel contains an Integrated Micro Processor which provides for the control and monitoring of multiple generation sources including Wind Turbines, Solar panel Arrays, Auxiliary Generation, Fuel cells and Storage Batteries all simultaneously. Additional improvements to prior art include the Integrated Micro Processor controlled independent maximum power point tracking algorithms for both the Wind Turbine and the Solar panel Arrays that work in conjunction with an Electronic Charge-Discharge Controller for the Storage Battery and the Electric Car Batteries. This integrated approach of the Multi-Mode Inverter/Converter with the Electronic Charge-Discharge Controller offers an overall efficiency and performance gain resulting in a higher output capacity at a lower cost.

With the evolution of the Internet, information shared across the Internet referred to as IP Networked Communication in the industry, has made it possible to intelligently manage not only the generation of electricity but also the use of it by the Home or Small Business from. By combining the GTC with IP Networking it is possible to now monitor and automatically operationally manage the Home or Small Business's energy resources in accordance with either accepted practices or by owner preferences or both. To this means, using RF Module (31) to communication with both the Integrated Micro Processor and a Programmable DSP, where DSP is known in industry as a Programmable Digital Signal Processor provides for a Remote Load Management Modules (80) to manage electric energy usage at two levels. The first level, is to just reduce the overall number of electric appliances running and consuming electricity at any given moment in time. This is accomplished by removing an Electric Plug from an Electric Receptacle for an Electric Appliance that is to be managed, and plugging the same Electric Plug into the Remote Load Management Module which is then plugged right back into the same Electrical Receptacle. For appliances that do not have Electric Plugs, a Licensed Electrician can install a permanently wired version of the Remote Load Management Module that is permanently connected to the Electric Appliance without using any Electric Plug, this is sometimes called a Hardwired Appliance or a Hardwired Connection in the electric industry. The Remote Load Management Module communicates using IP Networked Communication by way of an Ethernet Over Power Wire connection or wirelessly using a ZigBee or a Blue Tooth communication connection to the Programmable DSP in real time, relaying the Load and the Operational Parameter information of the connected Electric Appliance to the Programmable DSP. This information can be used to turn the appliance off, run them for shorter periods of time, cycling them less frequently. This type of an Appliance Load Management will result in a reduction in the amount of electric energy used by each participating Electric Appliance.

A second level of load management for Electric Appliances is Peak Load control when Electric Appliances start. Getting a train car rolling from a dead stop requires much more energy and effort then keeping the car rolling once it is moving. Likewise, the same is true when starting Electric Appliances. An air conditioner, pool pump, washing machine etc, will all require a higher level of electric energy to start than what will be required to maintain the Electric Appliance's normal operating speed or output, this is referred to as the Surge Current in the electric industry. If multiple Electric Applicances are started at the same time the Surge Current effect is cumulative with each additional Electric Appliance starting. This makes the momentary demand for electric energy even greater resulting in an elevated Peak Load. This Peak Load can be managed by the Remote Load Management Modules relaying the request for the participating Electric Appliance to start to the Programmable DSP the Programmable DSP then checks the system for other participating Electric Appliance start requests. If no other Electric Appliances are requesting to start the Remote Load Management Module will be instructed to allow the participating Electric Appliance to start, if there is a conflict with another start request, one of the requests will be delayed until the first Electric Appliance has reached its normal operating speed or range. The Remote Load Management Modules will then be instructed to start the next Electric Appliance requesting to start. The programmable processor offers the ability for the Home or Small Business owner to sequence, prioritize or establish conditional rules based logic to be applied to each participating Electric Appliance controlling its starting requests.

Also contained within the Weather Tight Custom Cabinet in its own isolated compartment on the bottom of the cabinet is an Energy Input Wiring Bus (34). This is where the generation sources are wired into the GTC. Directly above the Energy Input Wiring Bus there a Feed in Breaker (36) so that all generation input sources or storage devices can be separately shut down or disconnected for maintenance. A Main Energy Source Cable (35) for the Wind Turbine and the Solar Panel Array is also routed through the Energy Input Wiring Bus. Next to the row of the Feed In Breakers is a System Programming Port (37), this port is primarily used buy a Licensed Electrician during the installation of the GTC to program the Remote Load Management Modules and other functions that need to be set up and initialized during installation. This port will accept both USB and Ethernet cables.

Furthermore, there is a Heat Sink (33) on the back of the Weather Tight Custom Cabinet to dissipate the waste heat given off by the GTC. A Custom Mounting Bracket (38) for the GTC was specifically designed so one person can install the GTC. The Licensed Electrician simply uses the light weight template supplied with the GTC to install the Custom Mounting Bracket to the exterior wall of the Home or Small Business near the Meter Receiver Box for existing homes and small businesses and on new construction where the electric service is expected to enter the Home or Small Business. The GTC is then slipped over mounting pegs located on the Custom Mounting Bracket and locked in place with a Lock Down Screw. The present invention can be used on either an existing or newly constructed home or small business. When used on new construction the Weather Tight Custom Cabinet serves as the Meter Receiver Boz containing the New System Meter Socket for connection of the Utility Power Lines.

FIG. 3.2 is a perspective view of the installation process showing step one. Step one is locating the Electric Meter and the Meter Receiver Box making sure that there is room for the GTC installation, in close proximity to the Meter Receiver Box for proper installation of the Custom Mounting Bracket to the exterior wall of the Home or Small Business.

FIG. 4.2 is a perspective view of the installation process showing step two. Step two is removing the GTC from its packaging and hanging it on the Custom Mounting Bracket that was installed on the exterior wall of the Home or Small Business as detailed in step one of FIG. 4.2. To complete the attachment of the GTC the Lock Down Screw must be tightened to ensure that the GTC will not come off the Custom Mounting Bracket. Connect the Main Energy Source Cable from the Wind Turbine and/or the Solar Panel Arrays and connect any other generation sources such as Storage Battery the Storage Battery or Backup Auxiliary Generators.

FIG. 5.2 is a perspective view of the installation process showing step three. Step three is removing the Electric Meter from the Meter Receiver Box.

FIG. 6.2 is a perspective view of the installation process showing step four. Step four is plugging the Meter Jumper Plug into the existing Meter Receiver Box.

FIG. 7.2 is a perspective view of the installation process showing step five. Step five is plugging the Electric Meter into the New System Meter Socket.

FIG. 8.2 is a perspective view of the installation process showing step six. Step six is plugging each participating Electric Appliance into its own Remote Load Management Module and then plugging the Remote Load Management Module back into the Electrical Receptacle. Once all the Remote Load Management Modules are in place the Licensed Electrician plugs their computer into the System Programming Port and they are able to confirm the activation of each of the Remote Load Management Modules and test each Remote Load Management Module for its active participation in the web based IMDLM feature of the GTC. Alternatively, the GTC will automatically sense the connection of the Remote Load Management Module and report this through the Internet for the Smart Load Management giving an owner confirmation that the connected Electric Appliance is available for Conservation Control and Peak Load management the next time an owner logs into the Smart Load Management for their monitoring and control of their GTC. Once the GTC is installed and the Licensed Electrician has verified activation of each of the Remote Load Management Modules connected, the Feed In Breakers and the Main Breaker can be switched on and the GTC automatically synchronizes and begins producing and managing electric power, testing itself and reporting near real time data through the Internet to for the Smart Load Management.

FIG. 9.2 is a perspective view of the Meter Jumper Plug, a key element of the present invention. The Meter Jumper Plug makes it fast and simple to install the GTC on the Home or Small Business. The Meter Jumper Plug comprises a Plug Base (40) of similar size to the Electric Meter. The Plug Base is made from injection molded non-conductive plastic with Guide Blocks (41) molded in the base for quick positioning and safe plug in to the Meter Receiver Box. There is a Meter Plug Cover (52) that is injection molded plastic using a non-conductive plastic that is held in place with a Cover Screw (55). On the Meter Plug Cover is a Main Wire Port (53) with Wire Locking Ring (54). From this view you can clearly see knife blades that extend from the Power Blade Block, these knife like blades fit into the Meter Receiver Box to make the connections to the Feed In Utility Power Lines so the Utility Power Grid power can flow through the Meter Jumper Plug and through the Supply Power Wires No.1 and Supply Power Wires No.2 contained in the Custom Wire Harness over into the Weather Tight Custom Cabinet where they are attached to the supply side connections of the New System Meter Socket permitting the power to flow through the Electric Meter.

FIG. 10.2 is an exploded view of the Meter Jumper Plug. This view shows the interior parts of the Meter Jumper Plug. Molded in the Plug Base are a Blade Seats (42) and a Ground Seat (43) that securely hold the Power Blade Block and a Neutral and Ground Block (48) in their place and adds a margin of insulation between the blocks. Furthermore, molded in the Plug Base are locator strips for a Neutral and Ground Transfer Strap (44). Neutral and Ground Transfer Strap is held in place with a Transfer Strap Screw (45) that is threaded into the Neutral and Ground Block. On the end of the Neutral and Ground Transfer Strap is a Neutral Clamp (46) with a Clamp Screw (47), this is used to attach the Neutral Wire on the existing Meter Receiver Box. The Custom Wire Harness is securely held in place with a Blade Block Screw (51) and a Neutral Block Screw (49).

FIG. 11.2 is a perspective view of the Custom Wire Harness, a further key element of the present invention. The Custom Wire Harness contains the Neutral Wire and four power wires, the Supply Power Wire No.1 and the Supply Power Wire No.2 feeding power from the Feed In Utility Power Lines, to the New Meter Socket in the Weather Tight Custom Cabinet and the Feed In Power Wire No.3 and the Feed In Power Wire No.4 deliver electric power back to the Meter Jumper Plug and on into the Main Service Panel through the Meter Receiver Box.

FIG. 12.2 is a flow chart showing typical flow of electricity from the Feed In Utility Power Lines to the Main Service Panel. This flow chart is to show prior art or standard residential or small business existing system.

FIG. 13.2 is a flow chart showing flow of electricity In accordance with the present invention from the Utility Power Grid to the Feed In Utility Power Lines to the Main Service Panel. This drawing demonstrates the flow of electricity and technology of the present invention. The flow in starts from the Utility Power Grid connecting to the Feed In Utility Power Lines into the Existing Meter Receiver Box and out the Meter Jumper Plug through the Supply Power Wire No.1 and the Supply Power Wire No.2 contained in the Custom Wire Harness into the New System Meter Socket The Electric Meter is moved to the New System Meter Socket where the load side of the New System Meter Socket connects directly to the Main Breaker feed in, which serves to provide a Disconnect Flow Path (63). Having this Main Breaker directly in line with the output of the Electric Meter is one of the features that makes the GTC compliant with nationally adopted electric codes.

The next connection is between the output of the Main Beaker and the input side of the Electric Transfer Isolation Switch; this represents an Isolation Flow (64) that would automatically disconnect from the Utility Power Grid power during a power outage serving to automatically prevent locally generated electric energy from any of the forms of generation connected to the GTC from flowing back through the Feed In Utility Power Lines and back out to the Utility Power Grid. When Internet access is available to the GTC, electricity flow both in and out of the GTC can be monitored on site or remotely through the Smart Load Management function which is interactive for owners and technicians.

The GTC will permit the connection of numerous electric energy supply sources, simultaneously in any combination including the Utility Power Grid, Wind Turbines, Solar Panel Arrays, Fuel Cell or Auxiliary Generators powered by natural or LP gas, where excess generation during off peak periods can be used to charge the Storage Battery and the Electric Car and then during peak periods extract energy from the Storage Battery or the Electric Car to meet electric demand in the Home or Small Business. Storage Battery Each source of locally generated and stored electricity is fed into a Direct Current Bus (75) abbreviated as a DC Buss in the electric industry and then into the Multi-Mode Inverter/Converter which is micro processor controlled to convert the inputted DC electric energy into industry standard alternating current, referred to as AC power in the electric industry, this outputted AC power is what is used to power most Homes and Small Businesses and the AC Output represents an Inverter Flow (76). Once the AC power output of the Multi-Mode Inverter/Converter has been converted to be compatible with the Utility Power Grid power, it is transferred to a series of Power Control Circuits (77) for distribution to either the Main Service Panel to serve the Load in the Home or Small Business or if the Load does not require some or all of the outputted AC Power from the Multi-Mode Inverter/Converter the surplus can be used to charge the Storage Battery or the Electric Car or directed back through the Feed In Utility Power Lines and out to the Utility Power Grid.

This entire process is being controlled by the Multi-Mode Inverter/Converter's micro processor in conjunction with the Programmable DSP integrated into the GTC; this is illustrated by the Micro Processor Control Flow (78). The final embodiment of the present invention is a RF and Internet Communication Link (79). The RF and Internet Communication Link controls all communication aspects of the GTC; this includes communication with the Remote Load Management Modules the Multi-Mode Inverter/Converter and the Smart Load Management functionality when the GTC is connected to the Internet.

FIG. 14.2 is a perspective view of the completed System and Method showing all visible embodiments of the present invention. A standardized system, method and apparatus for plug-in connection and operational management of any combination of electric energy supply source including the Utility Power Grid, Auxiliary Generators, Wind Turbines, Fuel Cells, Storage Battery, Solar Panel Arrays and Electric Car all feeding into the Main Service Panel of the Home or Small Business and operationally monitored and managed with Smart Load Management through the Internet for both generation and Demand Response Management for individual participating electrical appliances that are being electrically powered from the Main Service Panel of the Home or Small Business.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A standardized system for connection of any combination of electric energy supply source including a Utility Power Grid, Auxiliary Generator, Wind Turbines, Fuel Cell, Storage Battery, Solar Panel Arrays, and an Electric Car which are collectively aggregated to feed into a Main Service Panel of a Home or Small Business through a single plug-in connection to a Home or Small Business's electrical service entrance and provide for collective operational monitoring and management through an IP Networked Communication Link, commonly referred to as IP Networked Communication across the Internet, thereby providing bidirectional communication and control between a Grid-Tied Controller (GTC) and a Smart Load Management functionality resident on the Internet, the system comprising:

Means for providing a scalable, single point, plug-in electrical connection that inserts into a Meter Receiver Box to feed electricity to a Main Service panel of the Home or Small Business, of which the insertion is accomplished completely outside the Home or Small Business, requiring no electrical rewiring inside the Home or Small Business to complete the connection which once completed, provides for the supplying of electric energy into the Home or Small Business or back out to the Utility Power Grid from any of the connected sources of electrical energy supply;

Means to provide for measuring and recording, in near real time, the amount of electric energy being produced by each, electric energy supply source feeding electric energy into the GTC;

Means to provide for the measuring and recording, in near real time, the amount of electric energy being using by the Home or Small Business;

Means to provide for the measuring and recording, in near real time, the amount of electric energy being used and operational status of one or more Electric Appliances being powered from the Main Service Panel of the Home or Small Business;

Means to provide for the measuring and recording, in near real time, environmental site parameters located at the Home or Small Business;

Means to provide for the measuring and recording, in near real time, operational parameters for each source of electric energy supply connected and feeding into the GTC;

Means to provide for, in near real time, bi-directional communication across the Internet of energy supply data, energy use data, operational and environmental parameter data to and from the Smart Load Management functionality which is accessible through the Internet and residing on the Internet Cloud;

Means to provide for programmatic control, in near real time through the Internet, programming control of a Micro Processor Programmable Controller Board and a Programmable Digital Signal Processor associated with the GTC;

Means to provide for programmatic control, in near real time through the Internet, programming control of Remote Load Management Modules connected to participating Electric Appliances powered from the Main Service Panel of the Home or Small Business;

Means to provide for extending the electric service entrance coming from the Utility Power Grid and connecting to the Meter Receiver Box located on the Home or Small Business, providing for electric energy to pass through to a New Meter Socket and return from the New Meter Socket located in a Weather Tight Custom Cabinet which is provided for by electric energy passing from the Meter Receiver Box into a Meter Jumper Plug and through a Supply Power Wire No.1 and a Supply Power Wire No.2 contained in a Custom Wire Harness which extends over into the Weather Tight Custom Cabinet where the terminating ends of the Supply Power Wire No.1 and the Supply Power Wire No.2 connect to the supply side of the New System Meter Socket contained in the Weather Tight Custom Cabinet;

Means to provide for the return of electric energy from the Weather Tight Custom Cabinet to the Meter Receiver box after it has passed through the New Meter Socket and an Electric Meter inserted in the New system Meter Socket providing for feed in electric energy to travel back through the Feed In Power Wire No.3 and the Feed In Power Wire No.4 contained inside the Custom Wire Harness returning from the Weather Tight Custom Cabinet to the Meter Jumper Plug installed on the Meter Receiving Box which is connected to and provides for the feed in of electric energy into the Main Service Panel of the Home or Small Business;

Means to provide for the Weather Tight Custom Cabinet to act as the Electrical Meter Receiver Box for newly constructed Home and Small Businesses providing for a weather tight connection point that a Power Mast connects to the Weather Tight Connection Cabinet and through which the Feed In Utility Power Lines enter into the Weather Tight Custom Cabinet, which is provided for by removing a Water Proof Cap from the top or bottom of the Weather Tight Custom Cabinet depending on whether the Feed In Utility Power Lines are approaching from underground or overhead of the Weather Tight Custom Cabinet and once inside the Weather Tight Custom Cabinet the Utility Power Lines are connected to the New System Meter Socket supply side connection terminals;

Means to provide for connecting any type or combination of electric energy supply source to all circuits of the electrical system of the Home or Small Business accomplished entirely outside the Home or Small Business;

Means to provide for scaling the electrical capacity of the GTC to match the Home or Small Business's electric capacity up to a maximum of 200 amps, 240 volts AC;

Means to provide for manual and simultaneous isolation and disconnection of all electric energy supply sources from the Utility Power Grid;

Means to provide for detecting the loss of the Utility Power Grid power during a Utility Power Grid power outage;

Means to provide for an automated simultaneous disconnection and isolation of all electric energy supply sources from the Utility Power Grid in the event of a power outage of the Utility Power Grid power;

Means to provide for manual, onsite disconnection of any selected electric energy supply source feeding through each of the Feed In Breakers located in the Weather Tight Custom Cabinet and then on into the Main Service Panel of the Home or Small Business;

Means to provide for remotely disconnecting, in near real time, any of the electric energy supply sources delivering electric energy to the Feed In Breakers, located in the Weather Tight Custom Cabinet, then passing on into the Main Service Panel of the Home or Small Business, where disconnection is accomplished using an Electrical Contactor that acts as an electrically activated switch invoked by signals from the Micro Processor Programmable Controller Board which applies preprogrammed algorithms and rules based triggers, which are communicated through the Internet from the Smart Load Management functionality residing on the Internet, to the operational data stored on the Micro Processor Programmable Controller Board for each electric energy supply source;

Means to provide for converting multiple sources of input AC or DC electrical energy into electrical energy that is compatible with the Utility Power Grid power both in voltage and frequency;

Means to provide for onsite visual control and monitoring of a Multi-Mode Inverter/Converter from a liquid emitting diode (LED) display to check the GTC operational status, program features and initiate maintenance procedures;

Means to provide for bidirectional IP Networked Communication through the Home or Small Business's electrical Power Wires for communication with the Remote Load Management Modules connected to electrical appliances powered from the Main Service Panel of the Home or Small Business;

Means to provide for bidirectional communication using wireless ZipBee communication protocol for communication with the Remote Load Management Modules connected to electrical appliances powered from the Main Service Panel of the Home or Small business and an Electric Meter provided by the Electric Power Utility Company for use at the Home or Small Business;

Means to provide for the mounting of the GTC on the exterior wall of the Home or Small Business using a Custom Mounting Bracket that provides sufficient stand off from the wall to radiate any accumulated heat being released by the GTC and will give easy access for the connection of electric energy supply sources into an Energy Input Wiring Bus on the bottom of the Weather Tight Custom Cabinet;

Means to provide for heat dissipation by a Heat Sink mounted to the back of the Weather Tight Custom Cabinet;

Means to provide for feeding electric energy generated by the Solar Panel Arrays and the Wind Turbines mounted on top of the Home or Small Business's roof or on a free standing pole down through a Main Energy Source Cable into the Energy Input Wiring Bus on the bottom of the Weather Tight Custom Cabinet;

Means to provide for a System Programming Port to program the Micro Processor Programmable Controller Board while onsite;

Means to provide for remote programming the Micro Processor Programmable Controller Board through the Internet from the Smart Load Management functionality residing on the Internet Cloud or directly by remote connection through the Internet using the Micro Processor Programmable Controller Board;

Means to provide for communication and control of energy supply sources connected to the Energy Input Wiring Bus using the Micro Processor Programmable Controller Board;

Means to provide for the local serving Electric Power Utility Company to communicate and control large numbers of GTC units and each of their respective energy supply sources connected to a GTC and feeding electricity out to the Utility Power Grid or into the Home or Small Business using the Micro Processor Programmable Controller Board connected to the Internet;

Means to provide for the local serving Electric Power Utility Company to communicate using the Micro Processor Programmable Controller Board contained in each GTC to control a number of the Remote Load Management Modules connected to each Electrical Appliance participating in the local serving Electric Power Utility Company's initiatives for an Intelligent Micro Distributed Load Management (IMDLM) effort to shave electric load and deal with demand response management;

Means to provide for the Water Proof Cap to cover a hole in the top and bottom of the Weather Tight Custom Cabinet when the Weather Tight Custom Cabinet is being used in conjunction with the Meter Jumper Plug and the Custom Wire Harness and not acting as the Meter Receiver Box where the Power Mast would normally connect if the Weather Tight Custom Cabinet were acting as the Meter Receiver Box on the Home or Small Business;

Means to provide for mounting individual components that comprise the Meter Jumper Plug to a Plug Base;

Means to provide for guiding the alignment of the Meter Jumper Plug during installation is accomplished by the Guide Blocks;

Means to provide for securing a Neutral and Ground Block in a Ground Seat located on the Plug Base for proper alignment and attachment of a Neutral Wire and a Grounding Wire using a Neutral Block Screw;

Means to provide for transitioning the Grounding Wire from the Meter Receiver Box to a Meter Base Socket located within the Meter Receiver Box by using a Neutral Clamp and a Clamp Screw to secure the Neutral Wire and the Grounding Wire to a Neutral and Ground Transfer Strap which is secured to the Plug Base by a Transfer Strap Screw;

Means to provide for securing the Supply Power Wire No.1, the Supply Power Wire No.2, the Feed In Power Wire No.3 and the Feed In Power Wire No.4 to a Power Blade Blocks using a Block Screw and then inserted in Blade Seats located on the Plug Base within the Meter Jumper Plug;

Means to provide for creating a weather tight seal for component elements contained inside the Meter Jumper Plug using a Double Seal on the Plug Base that interlocks with a Meter Plug Cover;

Means to provide for attaching the Custom Wire Harness to the Meter Jumper Plug using a Wire Locking Ring which provides for a weather tight attachment and then inserts into a Main Wire Port of the Meter Plug Cover;

Means to provide for securing the Meter Plug Cover to the Plug Base using a Cover Screw;

Means to provide for illuminated visual demonstration, from the exterior of the Weather Tight Custom Cabinet, the presence of electric energy from the Utility Power Grid to a Main Breaker contained inside the Weather Tight Custom Cabinet and from the Main Breaker back to the Utility Power Grid;

Means to provide for visually demonstrating from the exterior of the Weather Tight Custom Cabinet the flow of electricity from the Energy Input Wiring Bus to the Main Service Panel of the Home or Small Business and back to the Utility Power Grid;

Means to provide for illuminated visual demonstration, from exterior of the Weather Tight Custom Cabinet, the presence of electric energy to and from a Charge/Discharge Controller for an Electric Car which is either plugged into an electric receptacle or permanently hard-wired to an electric circuit powered from the Main Service Panel of the Home or Small Business;

Means to provide for illuminated visual demonstration, from the exterior of the Weather Tight Custom Cabinet, the presence of electric energy to and from the Charge/Discharge Controller for the Storage Battery connected to the Energy Input Wiring Bus of the Weather Tight Custom Cabinet;

Means to provide for illuminated visual demonstration, from the exterior of the Weather Tight Custom Cabinet, the presence of electric energy at each of the Feed in Breakers located in the Weather Tight Custom Cabinet;

Means to provide for heating and venting moisture out of the Weather Tight Custom Cabinet;

Means to provide for isolating high voltage AC wiring from lower voltage or DC power wiring from the electric energy from the Electric Power Utility Company or other connected electric energy supply sources wired inside the Weather Tight Custom Cabinet;

Means to provide for suppressing surge currents and spike voltages to protect each of the electric components of the GTC;

Means to provide for grounding isolation of lighting strikes to protect each of the electric components of the GTC;

Means to provide for a time delay in reconnecting the GTC to the Utility Power Grid after there has been a power outage of the Utility Power Grid power;

Means to provide an electric power receptacle, with appropriate voltage and frequency for the geographic region in which the GTC is located, inside the Weather Tight Custom Cabinet for use by GTC service personnel when providing service that requires powering any electric tool that maybe required;

Means to provide for electric power to the Micro Processor Programmable Controller Board located inside the Weather Tight Custom Cabinet;

Means to provide for a terminal connection block to connect electrical wires to the Micro Processor Programmable Controller Board;

Means to provide for an Electrical Power Supply that provides baseline voltage during a power outage of the Utility Power Grid permitting the Multi-Mode Inverter/Converter to synchronize voltage and frequency for continued operation during the Utility Power Grid power outage thereby providing continued electric power to the Main Service Panel of the Home or Small Business;

Means to provide for charging batteries contained in the Electrical Power Supply using the Utility Power Grid power when available and power from the Multi-Mode Inverter/Converter during a power outage of the Utility Power Grid;

Means to provide for illuminated, real time detection, from outside the Weather Tight Custom Cabinet, the presence of electric energy that is flowing to or from the Main Breaker and to or from the New System Meter Socket located inside the Weather Tight Custom Cabinet;

Means to provide for illuminated, real time detection, from outside the Weather Tight Custom Cabinet, the presence of electric energy that is flowing to the Main Service Panel through the Feed In Power Wire No.3 and the Feed In Power Wire No.4 contained in the Custom Wiring Harness coming from the Energy Input Wiring Bus located in the Weather Tight Custom Cabinet;

Means to provide for illuminated, real time detection, from outside the Weather Tight Custom Cabinet the Energy Input Wiring Bus contained in the Weather Tight Custom Cabinet back to the Meter Receiver Box;

Means to provide for unattended, automated electric load reduction in the Home or Small Business down to match the amount of electric energy available from connected electric energy supply sources when a loss of the Utility Power Grid power occurs;

Means to provide for unattended, automated detection of a loss of the Utility Power Grid power, and automatically start the Auxiliary Generator if connected to the GTC;

Means to provide for the unattended, automated detection of the return of the Utility Power Grid power and automatically disengage the Auxiliary Generator and provide for a cool down period then turn off the Auxiliary Generator.

2. The System of claim 1 further comprising:

Means to provide for a plug-in connection to feed electricity to the Main Service Panel powering all electric circuits of the Home or Small Business and accomplished completely outside of the Home or Small Business;

Means to provide for inserting the Meter Jumper Plug into the Meter Receiver Box as a system for connecting the Utility Power Lines to the Supply Power Wire No.1 and the Supply Power Wire No.2 contained inside the Custom Wire Harness which exits the Meter Jumper Plug and extends over and connects with the Weather Tight Custom Cabinet where the Supply Power Wire No.1 and the Supply Power Wire No.2 attach to the New System Meter Socket supply side terminals.

3. The System of claim 1 further comprising:

Means to provide for the Feed In Power Wire No.3 and the Feed In Power Wire No.4, connected to the Energy Input Wiring Bus located inside the Weather Tight Custom Cabinet and returning to the Meter Jumper Plug through the Custom Wire Harness where they connect into the Power Blade Blocks feed in terminal secured to the Plug Base which inserts into the Meter Receiver Boz aligning the Power Blade Blocks and blades for contact with the wires feeding into the Main Service Panel of the Home or Small Business.

4. The System of claim 1 further comprising:

Means to provide for measuring and recording the total amount of electric energy being used in the Home or Small Business and communicated to the Micro Processor Programmable Controller Board that has programmatic algorithms to interpret voltage signals into measured power that is feeding into the Home or Small Business;

Means to provide for wireless communication with the Electric Meter when the Electric Meter is enabled with wireless ZigBee communications capability, offerering direct reporting to the Micro Processor Programmable Controller Board of the amount of electric power passing through the Electric Meter inserted in the New System Meter Socket located in the Weather Tight Custom Cabinet.

5. The System of claim 1 further comprising:

Means to provide for providing measured and recorded total electric energy supplied from the Utility Power Grid to the Home or Small Business and the same for excess electric energy delivered back to the Utility Power Grid from the Home or Small Business's GTC and communicating the flow of energy to the Micro Processor Programmable Controller Board where programmatic algorithms interpret a voltage signal into an amount of electric energy wherein that amount can be reported through the Internet to the Smart Load Management functionality residing on the Internet;

Means to provide for buffering and storing measured electric power amounts in memory located within the Micro Processor Programmable Controller Board where programmatic algorithms average stored amounts over a predetermined time period before reporting the averaged amount through the Internet to the Smart Load Management functionality residing on the Internet.

6. The System of claim 2, wherein there is a means to provide for a weather tight seal between the Meter Jumper Plug and the Meter Receiver Box and the Meter Plug Cover and the Plug Base and the Custom Wire Harness, Wire Locking Ring and the Main Wire Port.

7. The System of claim 2, wherein there is only a need for the Meter Jumper Plug and the Custom Wire Harness when connecting to the Meter Receiver Box on an existing Home or Small Business, if there is not an interest to remove the existing Meter Receiver Boz and utilize the Weather Tight Custom Cabinet in its place as would be the case with newly constructed Homes or Small Businesses.

8. The System of claim 2, wherein exposed components of the Meter Jumper Plug are constructed of non conductive, non Corrosive plastic composite material that is UV resistant.

9. The System of claim 1 further comprising:

Means to provide for continued operation of the GTC during a power outage of the Utility Power Grid is permitted in part by the Electronic Transfer Isolation Switch of either a 100 amp or 200 amp sized capacity of electric service provided by the Electric Power Utility Company, which the Electronic Transfer Isolation Switch automatically senses the loss of power from the Utility Power Grid and serves to disconnect the Utility Power Grid from the GTC thus precluding the backwards flow of electricity from the GTC out to the Utility Power Grid during a Utility Power Grid power outage;

Means to provide for automatically reducing demand for electricity within the Home or Small Business during a power outage of the Utility Power Grid such that the demand will be less than or equal to electric energy generation sources connected to the GTC, otherwise providing for the disconnection of the GTC if the demand exceeds the power generated by the electric energy generation sources;

Means to provide for the automatic reconnection and synchronization of both Voltage and frequency of the GTC to the Utility Power Grid upon the restoring of power available from the Utility Power Grid;

Means to provide for a pre-programmed time delay to occur before reconnection of the GTC to the Utility Power Grid once power available from the Utility Power Grid is restored after a power outage of the Utility Power Grid.

10. The System of claim 1 further comprising:

Means to provide for the Multi-Mode Inverter/Converter to utilize its topology to accept input of both AC and DC electric energy sources and invert and/or convert the input electric energy to AC output that is compatible with the Utility Power Grid voltage and frequency.

11. The System of claim 10, wherein there is provided a DC to DC Multi Tap Converter with Independent Maximum Power Point Tracking Algorithms applied to each channel of DC electric energy input that flows to a High Voltage DC Bus following an Inverter Flow into the Multi-Mode Inverter/Converter.

12. The System of claim 10, wherein there is provided an AC to DC Rectifier converting the Auxiliary Generator AC output to DC which is then fed into the Multi-Mode Inverter/Converter.

13. The System of claim 1, wherein is provided weather tight seals or construction so that the Weather Tight Custom Cabinet, the Meter Jumper Plug and all that comprises the GTC can be installed outside the Home or Small Business and exposed to the weather meeting all electric code requirements.

14. The System of claim 10, wherein is provided the Heat Sink which is integrally attached to the back of the Weather Tight Custom Cabinet containing the Multi-Mode Inverter/Converter to dispel heat generated during the operation of the Multi-Mode Inverter/Converter.

15. The System of claim 1 further comprising:

Means to provide for rapid mounting of the GTC on the exterior wall of the Home or Small Business using the Custom Mounting Bracket which provides for a lift and hook approach to attaching and locking the Weather Tight Custom Cabinet in place on the Custom Mounting Bracket attached to the outside wall of the Home or Small Business and being accomplished by a single person without the need for any specialized lifting equipment to assist with the mounting and installation of the Weather Tight Custom Cabinet;

Means to provide for the Custom Mounting Bracket to have sufficient space between the outside wall of the Home or Small Business and the Weather Tight Custom Cabinet, permitting sufficient conductive air flow to dissipate the heat generated from the Multi-Mode Inverter/Converter during operation.

16. The System of claim 1 further comprising:
Means to provide for connecting Wind Turbines or Solar Panel Arrays on the roof top of the Home or Small Business using a Main Energy Source Cable which provides for integrated multi conductor wires for both AC and DC power, serving to connect to both the Energy Input Wiring Bus and the Micro Processor Programmable Controller Board respectively both of which are located in the Weather Tight Custom Cabinet.

17. The System of claim 1 further comprising:
Means to provide for remotely, through the Internet, electronically turn on and off individual electrical supply sources connected to the Energy Input Wiring Bus through the use of an Electrical Contactor which acts as an electric switch electrically powered by the Micro Processor Programmable Controller Board;
Means to, while on site, manually turn on and off individual electrical supply sources connected to the Energy Input Wiring Bus using the Feed In Breakers.

18. The System of claim 1 further comprising:
Means to provide for an onsite computer connection to the Micro Processor Programmable Controller Board using an Ethernet or a USB connection through the System Programming Port that provides for installers and service personnel of the GTC to activate the Remote Load Management Modules, test the operation of the GTC, configure and perform programming updates to the Micro Processor Programmable Controller Board.

19. The System of claim 1 further comprising:
Means to provide for secure the Meter Jumper Plug and the Custom Wire Harness to the Meter Receiver Box and the Custom Wire Harness to the Weather Tight Custom Cabinet on the outside wall of the Home or Small Business so that the Meter Jumper Plug will remain tightly connected to the Meter Receiver Box.

20. The System of claim 1 further comprising:
Means to provide that the Weather Tight Custom Cabinet can be used in place of the Meter Receiver Boz normally used when constructing new Homes or Small Businesses;
Means to provide that when the Weather Tight Custom Cabinet is used in newly constructed Homes or Small Businesses the Water Proof Cap is removed to provide for the attachment of the Power Mast to the top or bottom of the Weather Tight Custom Cabinet depending on whether the Utility Power Wires are coming from the Utility Power Grid underground and feeding up into the Weather Tight Custom Cabinet or being strung above ground and dropped down into the Weather Tight Custom Cabinet.

21. The System of claim 2, wherein is provided the Plug Base to which the Meter Plug Cover attached forming a weather tight seal that protects the internal components of the Meter Jumper Plug from developing corrosion causing high resistance connections that result in excessive heat generation thereby accelerating the breakdown of insulation on the Supply Power Wire No.1 and Supply Power Wire No.2 and Feed In Power Wire No.3 and Feed In Power Wire No.4 which can lead to wire failure.

22. The System of claim 2, wherein is provided the Guide Blocks as an integral part of the Plug Base that assist with the alignment for the insertion of the Meter Jumper Plug into the Meter Receiver Box.

23. The System of claim 2, wherein there is a means for aligning and securing the Power Blade Blocks in the Blade Seats which is an integral part of the Plug Base thereby provides proper alignment of the Power Blade Block for its insertion into receiving receptacles contained inside of the Meter Receiver Box that insures positive contact for electrical continuity between the Power Blade Block and the receiving receptacles.

24. The System of claim 2, wherein there is a means provided for securing the Ground Seat, which is an integral part of the Plug Base, permitting secure mounting of the Neutral and Ground Block to the Plug Base to which the Neutral Wire and the Ground Wire contained in the Custom Wire Harness are secure to the Neutral and Ground Block with the Neutral Block Screw.

25. The system of claim 2, wherein there is a means to provide for the Neutral and Ground Transfer Strap, made of zinc plated copper, to be secured to the Plug Base and connected to the Neutral and Ground Block using the Transfer Strap Screw, the assembly of which, provides for connection of the Neutral Wire and the Ground Wire, coming from the Meter Receiver Box, by using the Neutral Clamp and the Clamp Screw to secure the wires firmly and in full contact against the Neutral and Ground Transfer Strap providing secure electrical continuity with the Neutral Wire and the Ground Wire coming from the Meter Receiver Boz.

26. The system of claim 2, wherein is provided with Main Wire Port as an integral part of the Meter Plug Cover which supports a weather tight connection of the Custom Wire Harness, containing the Supply Power Wire No.1, the Supply Power Wire No.2, the Feed In Power Wire No.3, the Feed In Power Wire No.4 and the Neutral Wire, using the Wire Locking Plug.

27. The System of claim 1 further comprising:
Means to provide for illuminated, real time, visual indication, from the outside of the Weather tight Custom Cabinet, that the Utility Power Grid power is present or not to the GTC, comprising a Meter Flow Path.

28. The System of claim 1 further comprising:
Means to provide for illuminated, real time, visual indication, from the outside of the Weather Tight Custom Cabinet, that electric power is present on the output side of an Electronic Transfer Isolation Switch.

29. The System of claim 1 further comprising:
Means to provide for illuminated, real time, visual indication, that electric power is present on the Feed In Power Wire No.3 and the Feed In Power Wire No.4 returning from the Weather Tight Custom Cabinet through the Custom Wire Harness into the Meter Jumper Plug and connecting to the Power Blade Blocks inside the Meter Jumper Plug that in turn feed electric power into the Meter Receiver Box and on into the Main Service Panel of the Home or Small Business.

30. The System of claim 1 further comprising:
Means to provide for illuminated, real time, visual indication, that electric power is present on the feedin side of the Multi-Mode Inverter/Converter for each source of electric supply feeding into the Multi-Mode Inverter/Converter.

31. The System of claim 1 further comprising:
Means to provide for illuminated, real time, visual indication, whether the Charge/Discharge Controller is charging or discharging the Storage Battery to feed into the Multi-Mode Inverter/Converter for supplying electricity to the Home or Small Business's Main Service Panel;
Means to provide for illuminated, real time, visual indication, whether the Charge/Discharge Controller is in a state of charging or discharging the Electric Car to feed into the Multi-Mode Inverter/Converter for supplying electricity to the Home or Small Business's Main Service Panel.

32. The System of claim 1 further comprising:
Means to provide for illuminated, real time, visual indication, whether Internet connectivity is present or not to the Micro Processor Programmable Controller Board;
Means to provide for illuminated, real time, visual indication, whether all of the Remote Load Management Modules connected to Electric Appliances in the Home or Small Business are active and available for communicating to and from the Micro Processor Programmable Controller Board.

33. The system of claim 1 further comprising:
Means for the Micro Processor Programmable Controller Board to gain access and communicate bidirectionally to the Internet.

* * * * *